US012747415B2

(12) United States Patent
Garcia Castro et al.

(10) Patent No.: US 12,747,415 B2
(45) Date of Patent: Sep. 29, 2026

(54) COMPOSITIONS AND THEIR APPLICATIONS

(71) Applicant: BASF SE, Ludwigshafen Am Rhein (DE)

(72) Inventors: Ivette Garcia Castro, Ludwigshafen (DE); Yannick Matt, Ludwigshafen (DE); Stephan Hueffer, Ludwigshafen (DE); Elena Wolf, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 242 days.

(21) Appl. No.: 18/709,646

(22) PCT Filed: Dec. 8, 2022

(86) PCT No.: PCT/EP2022/084897
§ 371 (c)(1),
(2) Date: May 13, 2024

(87) PCT Pub. No.: WO2023/110599
PCT Pub. Date: Jun. 22, 2023

(65) Prior Publication Data

US 2025/0011689 A1 Jan. 9, 2025

(30) Foreign Application Priority Data

Dec. 17, 2021 (EP) .................................... 21215646

(51) Int. Cl.

| | |
|---|---|
| ***C11D 3/20*** | (2006.01) |
| ***C08G 73/02*** | (2006.01) |
| ***C11D 3/26*** | (2006.01) |
| ***C11D 3/32*** | (2006.01) |
| ***C11D 3/37*** | (2006.01) |
| ***C11D 3/386*** | (2006.01) |
| ***C11D 11/00*** | (2006.01) |

(52) U.S. Cl.
CPC .......... *C11D 3/3723* (2013.01); *C08G 73/024* (2013.01); *C11D 3/2082* (2013.01); *C11D 3/26* (2013.01); *C11D 3/3769* (2013.01); *C11D 3/38609* (2013.01); *C11D 3/38618* (2013.01); *C11D 3/38627* (2013.01); *C11D 3/38636* (2013.01); *C11D 11/0094* (2013.01); *C11D 2111/12* (2024.01); *C11D 2111/14* (2024.01)

(58) Field of Classification Search
CPC ....... C11D 3/2082; C11D 3/26; C11D 3/3723; C11D 3/3769; C11D 3/38609; C11D 3/38618; C11D 3/38627; C11D 3/38636
USPC ....... 510/238, 320, 321, 392, 393, 475, 504, 510/505, 506
See application file for complete search history.

(56) References Cited

U.S. PATENT DOCUMENTS

| | | | |
|---|---|---|---|
| 4,734,523 | A | 3/1988 | Hofinger et al. |
| 6,358,570 | B1 | 3/2002 | Affinito |
| 6,462,006 | B1 | 10/2002 | Sorg et al. |
| 7,262,042 | B2 | 8/2007 | Weber et al. |

(Continued)

FOREIGN PATENT DOCUMENTS

| | | | |
|---|---|---|---|
| DE | 10064983 | A1 | 7/2002 |
| DE | 102005028295 | A1 | 11/2006 |

(Continued)

OTHER PUBLICATIONS

International Search Report for PCT/EP2022/084897 dated Apr. 3, 2023, 3 pages.

(Continued)

*Primary Examiner* — Gregory R Delcotto
(74) *Attorney, Agent, or Firm* — Armstrong Teasdale LLP

(57) ABSTRACT

Disclosed herein are compositions including (A) at least one polymer including (a) a core that bears one to 3 moieties of the general formula (I), (I)

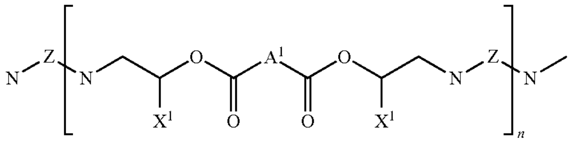

where Z are different or the same and selected from $C_5$-$C_{20}$-alkylene where in the $C_5$-$C_{20}$-alkylene at least one C-atom is replaced by an N-atom that bears a polyalkylene chain and where the C-atoms in the $C_5$-$C_{20}$-alkylene may be non-substituted or substituted with one or more O—$C_1$-$C_4$-alkyl groups, $A^1$ are different or the same and selected from $C_1$-$C_{12}$-alkylene, $C_6$-arylene, and $C_3$-$C_{12}$-cycloalkylene where $C_1$-$C_{12}$-alkylene and $C_3$-$C_{12}$-cycloalkylene may be non-substituted or substituted with one or more O—$C_1$-$C_4$-alkyl groups or OH groups and wherein $C_3$-$C_{12}$-cycloalkylene may bear one to three methyl groups, or based on citric acid, $X^1$ is selected from hydrogen, methyl, ethyl and combinations of at least two thereof, and n is in a range of from 1 to 100, and (b) polyalkylene oxide chains.

15 Claims, No Drawings

(56) References Cited

U.S. PATENT DOCUMENTS

| | | | |
|---|---|---|---|
| 7,569,226 B2 | 8/2009 | Weber et al. |
| 7,691,618 B2 | 4/2010 | Wieland et al. |
| 7,811,076 B2 | 10/2010 | Wieland et al. |
| 2005/0009167 A1 | 1/2005 | Weber et al. |
| 2005/0026269 A1 | 2/2005 | Kottwitz et al. |

FOREIGN PATENT DOCUMENTS

| | | | | |
|---|---|---|---|---|
| EP | 0283075 A2 | 9/1988 | |
| EP | 0851023 A2 | 7/1998 | |
| EP | 1921147 A2 | 5/2008 | |
| EP | 3088502 A1 * | 11/2016 | ............ C11D 3/225 |
| EP | 3088503 A1 * | 11/2016 | ............ D06M 13/46 |
| EP | 3798289 A1 * | 3/2021 | ........... C11D 17/044 |
| WO | 8906279 A1 | 7/1989 | |
| WO | 9102792 A1 | 3/1991 | |
| WO | 9219729 A1 | 11/1992 | |
| WO | 9523221 A1 | 8/1995 | |
| WO | 9634946 A1 | 11/1996 | |
| WO | 9820115 A1 | 5/1998 | |
| WO | 9820116 A1 | 5/1998 | |
| WO | 9911768 A1 | 3/1999 | |
| WO | 0144452 A1 | 6/2001 | |
| WO | 03006602 A2 | 1/2003 | |
| WO | 2004003186 A2 | 1/2004 | |
| WO | 2004041979 A2 | 5/2004 | |
| WO | 2007006305 A1 | 1/2007 | |
| WO | 2011036263 A1 | 3/2011 | |
| WO | 2011036264 A1 | 3/2011 | |
| WO | 2011064154 A2 | 6/2011 | |
| WO | 2011072099 A2 | 6/2011 | |
| WO | 2019233795 A1 | 12/2019 | |
| WO | 2020069913 A1 | 4/2020 | |
| WO | 2021105330 A1 | 6/2021 | |
| WO | 2022008416 A1 | 1/2022 | |

OTHER PUBLICATIONS

Written Opinion for PCT/EP2022/084897 dated Apr. 3, 2023, 6 pages.

Delmar, et al., "A Sensitive New Substrate for Chymotrypsin", Analytical Biochemistry, vol. 99, pp. 316-320 (1999).

Gupta, et al., "An Overview on Fermentation, Downstream Processing and Properties of Microbial Alkaline Proteases", Applied Microbiology and Biotechnology, vol. 60, pp. 381-395 (2002).

Gupta, et al., "Lipase Assays for Conventional and Molecular Screening: An Overview", Biotechnology and Applied Biochemistry, vol. 37, pp. 63-71 (2003).

Jacobs, et al., "Cloning, Sequencing and Expression of Subtilisin Carlsberg from Bacillus Licheniformis", Nucleic Acids Research, vol. 13, No. 24, pp. 8913-8926 (1985).

Needleman, et al., "A General Method Applicable to the Search for Similarities in the Amino Acid Sequence of Two Proteins", Journal of Molecular Biology, vol. 48, pp. 443-453 (1970).

Smith, et al., "Subtilisin Carlsberg: V. The Complete Sequence; Comparison With Subtilisin Bpn; Evolutionary Relationships", Journal of Biological Chemistry, vol. 243, No. 9, pp. 2184-2191 (1968).

Vasantha, et al., "Expression of Bovine Pancreatic Ribonuclease A Coded by a Synthetic Gene in Bacillus Subtilis", Gene, vol. 76, pp. 53-60 (1989).

Wells, et al., "Cloning, Sequencing, and Secretion of Bacillus Amyloliquefaciens Subtillisin in Bacillus Subtilis", Nucleic Acids Research, vol. 11, No. 22, pp. 7911-7925 (1983).

* cited by examiner

COMPOSITIONS AND THEIR APPLICATIONS

CROSS-REFERENCE TO RELATED APPLICATIONS

This application is a U.S. National Phase Application of International Patent Application No. PCT/EP22/84897, filed Dec. 8, 2022, which claims priority to EP patent application Ser. No. 21/215,646.7 filed Dec. 17, 2021, and each of which is hereby incorporated by reference herein.

The present invention is directed towards liquid detergent compositions comprising (A) at least one polymer comprising (a) a core that bears one to 3 moieties of the general formula (I), (I)

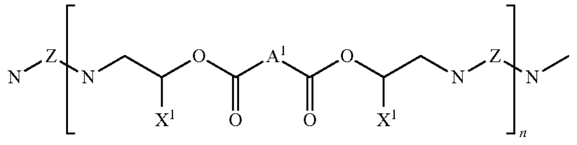

wherein Z are different or the same and selected from $C_5$-$C_{20}$-alkylene wherein in said $C_5$-$C_{20}$-alkylene at least one C-atom is replaced by an N-atom that bears a polyalkylene chain and wherein the C-atoms in said $C_5$-$C_{20}$-alkylene may be non-substituted or substituted with one or more O—$C_1$-$C_4$-alkyl groups, $A^1$ are different or the same and selected from $C_1$-$C_{12}$-alkylene, $C_6$-arylene, and $C_3$-$C_{12}$-cycloalkylene wherein $C_1$-$C_{12}$-alkylene and $C_3$-$C_{12}$-cycloalkylene may be non-substituted or substituted with one or more O—$C_1$-$C_4$-alkyl groups or OH groups and wherein $C_3$-$C_{12}$-cycloalkylene may bear one to three methyl groups, or based on citric acid, $X^1$ is selected from hydrogen and methyl and ethyl and combinations of at least two of the foregoing, n is in the range of from 1 to 100, (b) polyalkylene oxide chains.

Furthermore, the present invention is directed to polymers useful for such compositions, and to a process for making such polymers.

Laundry detergents have to fulfil several requirements. They need to remove all sorts of soiling from laundry, for example all sorts of pigments, clay, fatty soil, and dyestuffs including dyestuff from food and drinks such as red wine, tea, coffee, and fruit including berry juices. Laundry detergents also need to exhibit a certain storage stability. Especially laundry detergents that are liquid or that contain hygroscopic ingredients often lack a good storage stability, e.g., enzymes tend to be deactivated.

Fatty soilings are still a challenge in laundering. Although numerous suggestions for removal have been made—polymers, enzymes, surfactants—solutions that work well are still of interest. It has been suggested to use a lipase to support fat removal but many builders—especially in liquid laundry detergents—do not work well with lipase.

It was therefore an objective to provide a detergent composition that fulfils the requirements discussed above. It was further an objective to provide ingredients that fulfil the above requirements, and it was an objective to provide a process to make such ingredients and detergent compositions.

Accordingly, the liquid detergent compositions defined at the outset have been found, hereinafter also referred to as inventive compositions or compositions according to the present invention.

Inventive compositions comprise (A) at least one polymer, hereinafter also referred to as polymer (A), wherein such polymer (A) comprises (a) a core that bears one to three moieties according to general formula (I)

(I)

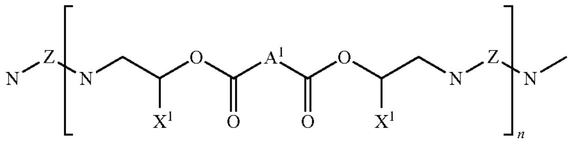

wherein Z are different or the same and selected from $C_5$-$C_{20}$-alkylene, preferably $C_6$-$C_{12}$-alkylene, straight-chain or branched, wherein in said $C_5$-$C_{20}$-alkylene or $C_6$-$C_{12}$-alkylene at least one C-atom is replaced by an N-atom that bears a polyalkylene chain, for example one to 3 C-atoms are replaced.

Beyond the foregoing, said $C_5$-$C_{20}$-alkylene or $C_6$-$C_{12}$-alkylene may otherwise be non-substituted or substituted with one or more O—$C_1$-$C_4$-alkyl groups.

In one embodiment of the present invention, all Z are selected from $(CH_2)_{z1}$—$[N(CH_2)_{z2}]_{z4}$—$N(CH_2)_{z3}$—, wherein the variables z1, z2 and z3 are independently from each other selected from 2 to 4 and wherein z4 is selected from zero to 2, and wherein each $CH_2$-group may be substituted with one to two methyl or methoxy groups or preferably be non-substituted.

Said polyalkylene oxide side chains may be derived from $C_2$-$C_4$-alkylene oxide. Examples of $C_2$-$C_4$-alkylene oxides are ethylene oxide ("EO"), propylene oxide ("PO"), butylene oxide ("BuO"), and combinations of at least two of the foregoing, for example ethylene oxide and propylene oxide or ethylene oxide and butylene oxide, preferably in each case with the majority of the alkylene oxide units being EO. Preferred are propylene oxide and ethylene oxide with the majority being ethylene oxide, more preferred is ethylene oxide.

In one embodiment of the present invention, all Z are selected from —$(CH_2)_3$—N—$(CH_2)_2$— and $(CH_2)_3$—N—$(CH_2)_3$ and —$(CH_2)_3$—$N(CH_2)_2$—N—$(CH_2)_3$—. Preferably, all Z are same.

$X^1$ is selected from hydrogen and methyl and ethyl and combinations of at least two of the foregoing, preferred are methyl and combinations of methyl and hydrogen, and more preferred is hydrogen, $A^1$ are different or the same and selected from $C_1$-$C_{12}$-alkylene, preferably $C_2$-$C_4$-alkylene, for example —$CH_2CH_2$—, —$(CH_2)_3$—, —$(CH_2)_4$—, —$(CH_2)_5$—, —$(CH_2)_6$—, —$(CH_2)_8$—, —$(CH_2)_{10}$—, —$(CH_2)_{12}$—, preferred are —$CH_2CH_2$—, —$(CH_2)_3$—, —$(CH_2)_4$—, furthermore $C_6$-arylene, and $C_3$-$C_{12}$-cycloalkylene wherein $C_1$-$C_{12}$-alkylene and $C_3$-$C_{12}$-cycloalkylene may be non-substituted or substituted with one or more O—$C_1$-$C_4$-alkyl groups or OH groups and wherein $C_3$-$C_{12}$-cycloalkylene may bear one to three methyl groups, or based on citric acid, for example $—CH_2—C(CO_2H)(OH)—CH_2—$ or $—CH_2—C(OH)(CH_2—COOH)—$.

In one embodiment of the present invention, $A^1$ in polymer (A) is a mixture of $C_2$-$C_4$-alkylene and citric acid-based residues, for example in a molar ratio of from 1:10 to 15:1, preferably 1:5 to 10:1.

n is in the range of from 1 to 100, preferably 10 to 75.

The free valences on the nitrogen atoms in formula (I) bear polyalkylene chains (b) or $—CH_2—CH(X^1)—O(CO)-A^1-(CO)—O—CHX^1—CH_2—N—Z—N$ units, or hydrogen atoms. In embodiments with molecular weights $M_w$ of 10,000 g/mol or more, the free valences on the nitrogen atoms in formula (I) bear polyalkylene chains (b) or $—CH_2—CH(X^1)—O—CHX^1—CH_2—N—Z—N$ units.

In one embodiment of the present invention, polymer (A) may additionally bear one or more structural units according to general formula (X)

(X-1)

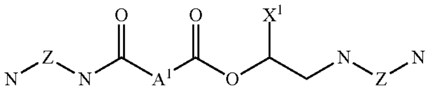

(X-2)

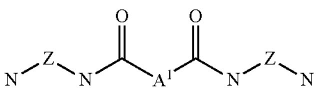

In one embodiment of the present invention, polymer (A) has an average molecular weight $M_w$ in the range of from 2,500 to 300,000 g/mol, preferably 5,000 to 250,000 g/mol, even more preferably up to 80,000 g/mol. The average molecular weight may be determined, e.g., by gel permeation chromatography (GPC) in tetrahydrofuran (THF) as mobile phase, with linear polymethyl methacrylate ("PMMA") as standard.

In one embodiment of the present invention, polymer (A) has a molecular weight distribution $M_w/M_n$ in the range of from 1.1 to 2.5.

In one embodiment of the present invention, polymer (A) has a Hazen colour number in the range of from 20 to 500, determined in a 10% weight aqueous solution.

In one embodiment of the present invention, polymer (A) has an OH value, measured according to DIN 53240 (2013), in the range of from 20 to 650, preferably 30 to 100 mg KOH/g polymer (A).

In one embodiment of the present invention, polymer (A) has a total amine value in the range of from 10 to 650, preferably 10 to 510 and more preferably 10 to 80 mg KOH/g polymer (A), determined according to ASTM D2074-07.

Polymer (A) further comprises (b) polyalkylene oxide chains.

Said polyalkylene oxide side chains may be derived from $C_2$-$C_4$-alkylene oxide. Examples of $C_2$-$C_4$-alkylene oxides are ethylene oxide ("EO"), propylene oxide ("PO"), butylene oxide ("BuO"), and mixtures of at least two of the foregoing, for example ethylene oxide and propylene oxide or ethylene oxide and butylene oxide. Preferred are propylene oxide and ethylene oxide, more preferred is ethylene oxide.

In one embodiment of the present invention, the weight ratio of core (a) to polyalkylene oxide chains (b) in polymer (A) is in the range of from 1 to 100 up to 1 to 2, preferred are 1 to 40 up to 1 to 3.

In one embodiment of the present invention, inventive compositions comprise at least one enzyme. Enzymes are identified by polypeptide sequences (also called amino acid sequences herein). The polypeptide sequence specifies the three-dimensional structure including the "active site" of an enzyme which in turn determines the catalytic activity of the same. Polypeptide sequences may be identified by a SEQ ID NO. According to the World Intellectual Property Office (WIPO) Standard ST.25 (1998) the amino acids herein are represented using three-letter code with the first letter as a capital or the corresponding one letter.

Any enzyme according to the invention relates to parent enzymes and/or variant enzymes, both having enzymatic activity. Enzymes having enzymatic activity are enzymatically active or exert enzymatic conversion, meaning that enzymes act on substrates and convert these into products. The term "enzyme" herein excludes inactive variants of an enzyme.

A "parent" sequence (of a parent protein or enzyme, also called "parent enzyme") is the starting sequence for introduction of changes (e.g., by introducing one or more amino acid substitutions, insertions, deletions, or a combination thereof) to the sequence, resulting in "variants" of the parent sequences. The term parent enzyme (or parent sequence) includes wild-type enzymes (sequences) and synthetically generated sequences (enzymes) which are used as starting sequences for introduction of (further) changes.

The term "enzyme variant" or "sequence variant" or "variant enzyme" refers to an enzyme that differs from its parent enzyme in its amino acid sequence to a certain extent. If not indicated otherwise, variant enzyme "having enzymatic activity" means that this variant enzyme has the same type of enzymatic activity as the respective parent enzyme.

In describing the variants of the present invention, the nomenclature described as follows is used:

Amino acid substitutions are described by providing the original amino acid of the parent enzyme followed by the number of the position within the amino acid sequence, followed by the substituted amino acid. Amino acid deletions are described by providing the original amino acid of the parent enzyme followed by the number of the position within the amino acid sequence, followed by *. Amino acid insertions are described by providing the original amino acid of the parent enzyme followed by the number of the position within the amino acid sequence, followed by the original amino acid and the additional amino acid. For example, an insertion at position 180 of lysine next to glycine is designated as "Gly180GlyLys" or "G180GK". In cases where a substitution and an insertion occur at the same position, this may be indicated as S99SD+S99A or in short S99AD. In cases where an amino acid residue identical to the existing amino acid residue is inserted, degeneracy in the nomenclature arises. If for example a glycine is inserted after the glycine in the above example this would be indicated by G180GG. Where different alterations can be introduced at a position, the different alterations are separated by a comma, e.g. "Arg170Tyr, Glu" represents a substitution of arginine at position 170 with tyrosine or glutamic acid. Alternatively different alterations or optional substitutions may be indicated in brackets e.g. Arg170 [Tyr, Gly] or Arg170 {Tyr, Gly}; or in short R170 [Y,G] or R170 {Y, G}; or in long R170Y, R170G.

Enzyme variants may be defined by their sequence identity when compared to a parent enzyme. Sequence identity usually is provided as "% sequence identity" or "% identity". For calculation of sequence identities, in a first step a sequence alignment has to be produced. According to this invention, a pairwise global alignment has to be produced, meaning that two sequences have to be aligned over their complete length, which is usually produced by using a mathematical approach, called alignment algorithm. According to the invention, the alignment is generated by using the algorithm of Needleman and Wunsch (J. Mol. Biol. (1979) 48, p. 443-453). Preferably, the program "NEEDLE" (The European Molecular Biology Open Software Suite (EMBOSS)) is used for the purposes of the current invention, with using the programs default parameter (gap open=10.0, gap extend=0.5 and matrix=EBLOSUM62).

According to this invention, the following calculation of %-identity applies: %-identity=(identical residues/length of the alignment region which is showing the respective sequence of this invention over its complete length)*100.

According to this invention, enzyme variants may be described as an amino acid sequence which is at least n % identical to the amino acid sequence of the respective parent enzyme with "n" being an integer between 10 and 100. In one embodiment, variant enzymes are at least 70%, at least 75%, at least 80%, at least 82%, at least 84%, at least 86%, at least 88%, at least 90%, at least 92%, at least 93%, at least 95%, at least 96%, at least 97%, at least 98%, or at least 99% identical when compared to the full-length amino acid sequence of the parent enzyme, wherein the enzyme variant has enzymatic activity.

"Enzymatic activity" means the catalytic effect exerted by an enzyme, which usually is expressed as units per milligram of enzyme (specific activity) which relates to molecules of substrate transformed per minute per molecule of enzyme (molecular activity). Variant enzymes may have enzymatic activity according to the present invention when said enzyme variants exhibit at least 20%, at least 25%, at least 30%, at least 35%, at least 40%, at least 45%, at 10 least 50%, at least 55%, at least 60%, at least 65%, at least 70%, at least 75%, at least 80%, at least 85%, at least 90%, at least 95%, or 100% of the enzymatic activity of the respective parent enzyme.

In one embodiment, enzyme is selected from hydrolases, preferably from proteases, amylases, lipases, cellulases, and mannanases.

In one embodiment of the present invention, inventive compositions comprise (B) at least one hydrolase, hereinafter also referred to as hydrolase (B), preferably selected from lipases, hereinafter also referred to as lipase (B).

"Lipases", "lipolytic enzyme", "lipid esterase", all refer to enzymes of EC class 3.1.1 ("carboxylic ester hydrolase"). Such a lipase (B) may have lipase activity (or lipolytic activity; triacylglycerol lipase, EC 3.1.1.3), cutinase activity (EC 3.1.1.74; enzymes having cutinase activity may be called cutinase herein), sterol esterase activity (EC 3.1.1.13) and/or wax-ester hydrolase activity (EC 3.1.1.50). Lipases (B) include those of bacterial or fungal origin.

Commercially available lipase (B) include but are not limited to those sold under the trade names Lipolase™, Lipex™, Lipolex™ and Lipoclean™ (Novozymes A/S), Preferenz™ L (DuPont), Lumafast (originally from Genencor) and Lipomax (Gist-Brocades/now DSM).

Suitable lipases (B) include also those that are variants of the above described lipases which have lipolytic activity. Suitable lipase variants include variants with at least 40 to 100% identity when compared to the full length polypeptide sequence of the parent enzyme as disclosed above. In one embodiment lipase variants having lipolytic activity may be at least 40%, at least 45%, at least 50%, at least 55%, at least 60%, at least 65%, at least 70%, at least 75%, at least 80%, at least 85%, at least 90%, at least 91%, at least 92%, at least 93%, at least 94%, at least 95%, at least 96%, at least 97%, at least 98% or at least 99% identical when compared to the full length polypeptide sequence of the parent enzyme as disclosed above.

Lipases (B) have "lipolytic activity". The methods for determining lipolytic activity are well-known in the literature (see e.g. Gupta et al. (2003), Biotechnol. Appl. Biochem. 37, p. 63-71). E.g. the lipase activity may be measured by ester bond hydrolysis in the substrate para-nitrophenyl palmitate (pNP-Palmitate, C: 16) and releases pNP which is yellow and can be detected at 405 nm.

In one embodiment, lipase (B) is selected from fungal triacylglycerol lipase (EC class 3.1.1.3). Fungal triacylglycerol lipase may be selected from lipases of *Thermomyces lanuginosa*. In one embodiment, at least one *Thermomyces lanuginosa* lipase is selected from triacylglycerol lipase according to amino acids 1-269 of SEQ ID NO: 2 of U.S. Pat. No. 5,869,438 and variants thereof having lipolytic activity.

*Thermomyces lanuginosa* lipase may be selected from variants having lipolytic activity which are at least 90%, at least 91%, at least 92%, at least 93%, at least 94%, at least 95%, at least 96%, at least 97%, at least 98% or at least 99% identical when compared to the full length polypeptide sequence of amino acids 1-269 of SEQ ID NO: 2 of U.S. Pat. No. 5,869,438.

*Thermomyces lanuginosa* lipase may be selected from variants having lipolytic activity comprising conservative mutations only, which do not pertain the functional domain of amino acids 1-269 of SEQ ID NO: 2 of U.S. Pat. No. 5,869,438. Lipase variants of this embodiment having lipolytic activity may be at least 95%, at least 96%, at least 97%, at least 98% or at least 99% similar when compared to the full length polypeptide sequence of amino acids 1-269 of SEQ ID NO: 2 of U.S. Pat. No. 5,869,438.

*Thermomyces lanuginosa* lipase may be selected from variants having lipolytic activity comprising at least the following amino acid substitutions when compared to amino acids 1-269 of SEQ ID NO: 2 of U.S. Pat. No. 5,869,438: T231R and N233R. Said lipase variants may further comprise one or more of the following amino acid exchanges when compared to amino acids 1-269 of SEQ ID NO: 2 of U.S. Pat. No. 5,869,438: Q4V, V60S, A150G, L227G, P256K.

*Thermomyces lanuginosa* lipase may be selected from variants having lipolytic activity comprising at least the amino acid substitutions T231R, N233R, Q4V, V60S, A150G, L227G, P256K within the polypeptide sequence of amino acids 1-269 of SEQ ID NO: 2 of U.S. Pat. No. 5,869,438 and are at least 95%, at least 96%, or at least 97% similar when compared to the full length polypeptide sequence of amino acids 1-269 of SEQ ID NO: 2 of U.S. Pat. No. 5,869,438.

*Thermomyces lanuginosa* lipase may be selected from variants having lipolytic activity comprising the amino acid substitutions T231R and N233R within amino acids 1-269 of SEQ ID NO: 2 of U.S. Pat. No. 5,869,438 and are at least 95%, at least 96%, at least 97%, at least 98%, or at least 99% similar when compared to the full length polypeptide sequence of amino acids 1-269 of SEQ ID NO: 2 of U.S. Pat. No. 5,869,438.

*Thermomyces lanuginosa* lipase may be a variant of amino acids 1-269 of SEQ ID NO: 2 of U.S. Pat. No. 5,869,438 having lipolytic activity, wherein the variant of amino acids 1-269 of SEQ ID NO: 2 of U.S. Pat. No.

5,869,438 is characterized in containing the amino acid substitutions T231R and N233R. Said lipase may be called Lipex herein.

In one embodiment of the present invention, a combination of at least two of the foregoing lipases (B) may be used.

In one embodiment of the present invention, lipases (B) are included in inventive composition in such an amount that a finished inventive composition has a lipolytic enzyme activity in the range of from 100 to 0.005 LU/mg, preferably 25 to 0.05 LU/mg of the composition. A Lipase Unit (LU) is that amount of lipase which produces 1 μmol of titratable fatty acid per minute in a pH stat. under the following conditions: temperature 30° C.; pH=9.0; substrate is an emulsion of 3.3 wt. % of olive oil and 3.3% gum arabic, in the presence of 13 mmol/l $Ca^{2+}$ and 20 mmol/l NaCl in 5 mmol/l Tris-buffer.

In one embodiment of the present invention, inventive compositions comprise (D) at least one protease (D), hereinafter also referred to as protease (D).

In one embodiment, at least one protease (D) is selected from the group of serine endopeptidases (EC 3.4.21), most preferably selected from the group of subtilisin type proteases (EC 3.4.21.62). Serine proteases or serine peptidases are characterized by having a serine in the catalytically active site, which forms a covalent adduct with the substrate during the catalytic reaction. A serine protease in the context of the present invention may be selected from the group consisting of chymotrypsin (e.g., EC 3.4.21.1), elastase (e.g., EC 3.4.21.36), elastase (e.g., EC 3.4.21.37 or EC 3.4.21.71), granzyme (e.g., EC 3.4.21.78 or EC 3.4.21.79), kallikrein (e.g., EC 3.4.21.34, EC 3.4.21.35, EC 3.4.21.118, or EC 3.4.21.119) plasmin (e.g., EC 3.4.21.7), trypsin (e.g., EC 3.4.21.4), thrombin (e.g., EC 3.4.21.5), and subtilisin. Subtilisin is also known as subtilopeptidase, e.g., EC 3.4.21.62, the latter hereinafter also being referred to as "subtilisin". The subtilisin related class of serine proteases shares a common amino acid sequence defining a catalytic triad which distinguishes them from the chymotrypsin related class of serine proteases. Subtilisins and chymotrypsin related serine proteases both have a catalytic triad comprising aspartate, histidine and serine.

Proteases are active proteins exerting "protease activity" or "proteolytic activity". Proteolytic activity is related to the rate of degradation of protein by a protease or proteolytic enzyme in a defined course of time.

The methods for analyzing proteolytic activity are well-known in the literature (see e.g. Gupta et al. (2002), Appl. Microbiol. Biotechnol. 60:381-395). Proteolytic activity may be determined by using Succinyl-Ala-Ala-Pro-Phe-p-nitroanilide (Suc-AAPF-pNA, short AAPF; see e.g. DelMar et al. (1979), Analytical Biochem 99, 316-320) as substrate. pNA is cleaved from the substrate molecule by proteolytic cleavage, resulting in release of yellow color of free pNA which can be quantified by measuring OD405.

Proteolytic activity may be provided in units per gram enzyme. For example, 1 U protease may correspond to the amount of protease which sets free 1 μmol folin-positive amino acids and peptides (as tyrosine) per minute at pH 8.0 and 37° C. (casein as substrate).

Proteases of the subtilisin type (EC 3.4.21.62) may be bacterial proteases originating from a microorganism selected from *Bacillus, Clostridium, Enterococcus, Geobacillus, Lactobacillus*, Lactococcus, *Oceanobacillus, Staphylococcus, Streptococcus*, or *Streptomyces* protease, or a Gram-negative bacterial polypeptide such as a *Campylobacter, E. coli, Flavobacterium*, Fusobacterium, *Helicobacter, Ilyobacter, Neisseria, Pseudomonas, Salmonella*, and *Ureaplasma.*

In one aspect of the invention, at least one protease (D) is selected from *Bacillus alcalophilus, Bacillus amyloliquefaciens, Bacillus brevis, Bacillus circulans, Bacillus clausii, Bacillus* coagulans, *Bacillus firmus, Bacillus gibsonii, Bacillus lautus, Bacillus lentus, Bacillus licheniformis, Bacillus megaterium, Bacillus pumilus, Bacillus sphaericus, Bacillus stearothermophilus, Bacillus subtilis*, or *Bacillus thuringiensis* protease.

In one embodiment of the present invention, at least one protease (D) is selected from the following: subtilisin from *Bacillus amyloliquefaciens* BPN' (described by Vasantha et al. (1984) J. Bacteriol. Volume 159, p. 811-819 and JA Wells et al. (1983) in Nucleic Acids Research, Volume 11, p. 7911-7925); subtilisin from *Bacillus licheniformis* (subtilisin Carlsberg; disclosed in E L Smith et al. (1968) in J. Biol Chem, Volume 243, pp. 2184-2191, and Jacobs et al. (1985) in Nucl. Acids Res, Vol 13, p. 8913-8926); subtilisin PB92 (original sequence of the alkaline protease PB92 is described in EP 283075 A2); subtilisin 147 and/or 309 (Esperase®, Savinase®, respectively) as disclosed in WO 89/06279; subtilisin from *Bacillus lentus* as disclosed in WO 91/02792, such as from *Bacillus lentus* DSM 5483 or the variants of *Bacillus lentus* DSM 5483 as described in WO 95/23221; subtilisin from *Bacillus alcalophilus* (DSM 11233) disclosed in DE 10064983; subtilisin from *Bacillus gibsonii* (DSM 14391) as disclosed in WO 2003/054184; subtilisin from *Bacillus* sp. (DSM 14390) disclosed in WO 2003/056017; subtilisin from *Bacillus* sp. (DSM 14392) disclosed in WO 2003/055974; subtilisin from *Bacillus gibsonii* (DSM 14393) disclosed in WO 2003/054184; subtilisin having SEQ ID NO: 4 as described in WO 2005/063974; subtilisin having SEQ ID NO: 4 as described in WO 2005/103244; subtilisin having SEQ ID NO: 7 as described in WO 2005/103244; and subtilisin having SEQ ID NO: 2 as described in application DE 102005028295.4.

Examples of useful proteases in accordance with the present invention comprise the variants described in: WO 92/19729, WO 95/23221, WO 96/34946, WO 98/20115, WO 98/20116, WO 99/11768, WO 01/44452, WO 02/088340, WO 03/006602, WO 2004/03186, WO 2004/041979, WO 2007/006305, WO 2011/036263, WO 2011/036264, and WO 2011/072099. Suitable examples comprise especially variants of subtilisin protease derived from SEQ ID NO:22 as described in EP 1921147 (which is the sequence of mature alkaline protease from *Bacillus lentus* DSM 5483) with amino acid substitutions in one or more of the following positions: 3, 4, 9, 15, 24, 27, 33, 36, 57, 68, 76, 77, 87, 95, 96, 97, 98, 99, 100, 101, 102, 103, 104, 106, 118, 120, 123, 128, 129, 130, 131, 154, 160, 167, 170, 194, 195, 199, 205, 206, 217, 218, 222, 224, 232, 235, 236, 245, 248, 252 and 274 (according to the BPN' numbering), which have proteolytic activity. In one embodiment, such a protease is not mutated at positions Asp32, His64 and Ser221 (according to BPN' numbering).

In one embodiment, at least one protease (D) has a sequence according to SEQ ID NO:22 as described in EP 1921147, or a protease which is at least 80% identical thereto and has proteolytic activity. In one embodiment, said protease is characterized by having amino acid glutamic acid, or aspartic acid, or asparagine, or glutamine, or alanine, or glycine, or serine at position 101 (according to BPN' numbering) and has proteolytic activity. In one embodiment, said protease comprises one or more further substitutions: (a) threonine at position 3 (3T), (b) isoleucine at position 4

(4I), (c) alanine, threonine or arginine at position 63 (63A, 63T, or 63R), (d) aspartic acid or glutamic acid at position 156 (156D or 156E), (e) proline at position 194 (194P), (f) methionine at position 199 (199M), (g) isoleucine at position 205 (205I), (h) aspartic acid, glutamic acid or glycine at position 217 (217D, 217E or 217G), (i) combinations of two or more amino acids according to (a) to (h).

At least one protease (D) may be at least 80% identical to SEQ ID NO:22 as described in EP 1921147 and is characterized by comprising one amino acid (according to (a)-(h)) or combinations according to (i) together with the amino acid 101E, 101D, 101N, 101Q, 101A, 101G, or 101S (according to BPN' numbering). In one embodiment, said protease is characterized by comprising the mutation (according to BPN' numbering) R101E, or S3T+V4I+V205I, or R101E and S3T, V4I, and V205I, or S3T+V4I+V199M+V205I+L217D, and having proteolytic activity. A protease having a sequence according to SEQ ID NO: 22 as described in EP 1921147 with 101E may be called Lavergy herein.

In one embodiment, protease according to SEQ ID NO:22 as described in EP 1921147 is characterized by comprising the mutation (according to BPN' numbering) S3T+V4I+S9R+A15T+V68A+D99S+R101S+A103S+I104V+N218D, and by having proteolytic activity.

Inventive compositions may comprise a combination of at least two proteases, preferably selected from the group of serine endopeptidases (EC 3.4.21), more preferably selected from the group of subtilisin type proteases (EC 3.4.21.62)—all as disclosed above.

It is preferred to use a combination of lipase (B) and protease (D) in compositions, for example 1 to 2% by weight of protease (D) and 0.1 to 0.5% by weight of lipase (B), both referring to the total weight of the composition.

In the context of the present invention, lipase (B) and/or protease (D) is deemed called stable when its enzymatic activity "available in application" equals at least 60% when compared to the initial enzymatic activity before storage. An enzyme may be called stable within this invention if its enzymatic activity available in application is at least 60%, at least 65%, at least 70%, at least 75%, at least 80%, at least 85%, at least 90%, at least 92%, at least 94%, at least 95%, at least 96%, at least 98%, at least 99%, or at least 99.5% when compared to the initial enzymatic activity before storage.

Subtracting a % from 100% gives the "loss of enzymatic activity during storage" when compared to the initial enzymatic activity before storage. In one embodiment, an enzyme is stable according to the invention when essentially no loss of enzymatic activity occurs during storage, i.e. loss in enzymatic activity equals 0% when compared to the initial enzymatic activity before storage. Essentially no loss of enzymatic activity within this invention may mean that the loss of enzymatic activity is less than 30%, less than 25%, less than 20%, less than 15%, less than 10%, less than 9%, less than 8%, less than 7%, less than 6%, less than 5%.

In one embodiment of the present invention, inventive compositions comprise (C) at least one anionic surfactant, hereinafter also being referred to as anionic surfactant (C).

Examples of anionic surfactants (C) are alkali metal and ammonium salts of $C_8$-$C_{18}$-alkyl sulfates, of $C_8$-$C_{18}$-fatty alcohol polyether sulfates, of sulfuric acid half-esters of ethoxylated $C_4$-$C_{12}$-alkylphenols (ethoxylation: 1 to 50 mol of ethylene oxide/mol), $C_{12}$-$C_{18}$ sulfo fatty acid alkyl esters, for example of $C_{12}$-$C_{18}$ sulfo fatty acid methyl esters, furthermore of $C_{12}$-$C_{18}$-alkylsulfonic acids and of $C_{10}$-$C_{18}$-alkylarylsulfonic acids. Preference is given to the alkali metal salts of the aforementioned compounds, particularly preferably the sodium salts.

Further examples of anionic surfactants (C) are soaps, for example the sodium or potassium salts of stearic acid, oleic acid, palmitic acid, ether carboxylates, and alkylether phosphates.

In a preferred embodiment of the present invention, anionic surfactant (C) is selected from compounds according to general formula (II)

$$R^1\text{—}O(CH_2CH_2O)_x\text{—}SO_3M \qquad \text{(II)}$$

wherein $R^1$ n-$C_{10}$-$C_{18}$-alkyl, especially with an even number of carbon atoms, for example n-decyl, n-dodecyl, n-tetradecyl, n-hexadecyl, or n-octadecyl, preferably $C_{10}$-$C_{14}$-alkyl, and even more preferably n-$C_{12}$-alkyl, x being a number in the range of from 1 to 5, preferably 2 to 4 and even more preferably 3.

M being selected from alkali metals, preferably potassium and even more preferably sodium.

In anionic surfactant (C), x may be an average number and therefore n is not necessarily a whole number, while in individual molecules according to formula (I), x denotes a whole number.

In one embodiment of the present invention, inventive compositions may contain 0.1 to 60% by weight of anionic surfactant (C), preferably 5 to 50% by weight.

Inventive compositions may comprise ingredients other than the aforementioned. Examples are non-ionic surfactants, fragrances, dyestuffs, biocides, preservatives, enzymes, hydrotropes, builders, viscosity modifiers, polymers, buffers, defoamers, and anti-corrosion additives.

Preferred inventive compositions may contain one or more non-ionic surfactants.

Preferred non-ionic surfactants are alkoxylated alcohols, di- and multiblock copolymers of ethylene oxide and propylene oxide and reaction products of sorbitan with ethylene oxide or propylene oxide, alkyl polyglycosides (APG), hydroxyalkyl mixed ethers and amine oxides.

Preferred examples of alkoxylated alcohols and alkoxylated fatty alcohols are, for example, compounds of the general formula (III a)

(III a)

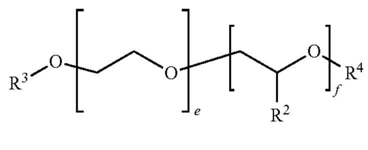

in which the variables are defined as follows:

$R^2$ is identical or different and selected from hydrogen and linear $C_1$-$C_{10}$-alkyl, preferably in each case identical and ethyl and particularly preferably hydrogen or methyl, $R^3$ is selected from $C_8$-$C_{22}$-alkyl, branched or linear, for example n-$C_8H_{17}$, n-$C_{10}H_{21}$, n-$C_{12}H_{25}$, n-$C_{14}H_{29}$, n-$C_{16}H_{33}$ or n-$C_{18}H_{37}$, $R^4$ is selected from $C_1$-$C_{10}$-alkyl, methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl or isodecyl, The variables e and f are in the range from zero to 300, where the sum of e and f is at least one, preferably in the range of from 3 to 50. Preferably, e is in the range from 1 to 100 and f is in the range from 0 to 30.

In one embodiment, compounds of the general formula (II) may be block copolymers or random copolymers, preference being given to block copolymers.

Other preferred examples of alkoxylated alcohols are, for example, compounds of the general formula (III b)

(III b)

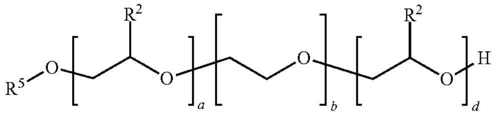

in which the variables are defined as follows:

$R^2$ is identical or different and selected from hydrogen and linear $C_1$-$C_0$-alkyl, preferably identical in each case and ethyl and particularly preferably hydrogen or methyl, $R^5$ is selected from $C_6$-$C_{20}$-alkyl, branched or linear, in particular n-$C_8H_{17}$, n-$C_{10}H_{21}$, n-$C_{12}H_{25}$, n-$C_{13}H_{27}$, n-$C_{15}H_{31}$, n-$C_{14}H_{29}$, n-$C_{16}H_{33}$, n-$C_{18}H_{37}$, a is a number in the range from zero to 10, preferably from 1 to 6, b is a number in the range from 1 to 80, preferably from 4 to 20, d is a number in the range from zero to 50, preferably 4 to 25.

The sum a+b+d is preferably in the range of from 5 to 100, even more preferably in the range of from 9 to 50.

Compounds of the general formula (III) may be block copolymers or random copolymers, preference being given to block copolymers.

Further suitable nonionic surfactants are selected from di- and multiblock copolymers, composed of ethylene oxide and propylene oxide. Further suitable nonionic surfactants are selected from ethoxylated or propoxylated sorbitan esters. Amine oxides or alkyl polyglycosides, especially linear $C_4$-$C_{16}$-alkyl polyglucosides and branched $C_8$-$C_{14}$-alkyl polyglycosides such as compounds of general average formula (IV) are likewise suitable.

(IV)

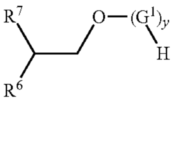

wherein:

$R^6$ is $C_1$-$C_4$-alkyl, in particular ethyl, n-propyl or isopropyl, $R^7$ is —$(CH_2)_2$—$R_6$, $G^1$ is selected from monosaccharides with 4 to 6 carbon atoms, especially from glucose and xylose, y in the range of from 1.1 to 4, y being an average number, Further examples of non-ionic surfactants are compounds of general formula (V) and (VI)

(V)

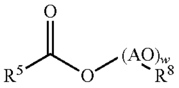

(VI)

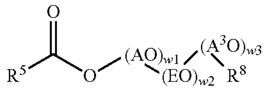

AO is selected from ethylene oxide, propylene oxide and butylene oxide,

EO is ethylene oxide, $CH_2CH_2$—O, $R_8$ selected from $C_8$-$C_{18}$-alkyl, branched or linear, and $R^5$ is defined as above.

$A^3O$ is selected from propylene oxide and butylene oxide,

W is a number in the range of from 15 to 70, preferably 30 to 50, w1 and w3 are numbers in the range of from 1 to 5, and w2 is a number in the range of from 13 to 35.

An overview of suitable further nonionic surfactants can be found in EP-A 0 851 023 and in DE-A 198 19 187.

Mixtures of two or more different nonionic surfactants selected from the foregoing may also be present.

Other surfactants that may be present are selected from amphoteric (zwitterionic) surfactants and anionic surfactants and mixtures thereof.

Examples of amphoteric surfactants are those that bear a positive and a negative charge in the same molecule under use conditions. Preferred examples of amphoteric surfactants are socalled betaine-surfactants. Many examples of betaine-surfactants bear one quaternized nitrogen atom and one carboxylic acid group per molecule. A particularly preferred example of amphoteric surfactants is cocamidopropyl betaine (lauramidopropyl betaine).

Examples of amine oxide surfactants are compounds of the general formula (VII)

(VII)

$$R^9R^{10}R^{11}N \longrightarrow O$$

wherein $R^9$, $R^{10}$, and $R^{11}$ are selected independently from each other from aliphatic, cycloaliphatic or $C_2$-$C_4$-alkylene $C_{10}$-$C_{20}$-alkylamido moieties. Preferably, R9 is selected from $C_8$-$C_{20}$-alkyl or $C_2$-$C_4$-alkylene $C_{10}$-$C_{20}$-alkylamido and R10 and R11 are both methyl.

A particularly preferred example is lauryl dimethyl aminoxide, sometimes also called lauramine oxide. A further particularly preferred example is cocamidylpropyl dimethylaminoxide, sometimes also called cocamidopropylamine oxide.

In one embodiment of the present invention, inventive compositions may contain 0.1 to 60% by weight of at least one surfactant, selected from non-ionic surfactants, amphoteric surfactants and amine oxide surfactants.

In a preferred embodiment, inventive solid detergent compositions for cleaners and especially those for automatic dishwashing do not contain any anionic surfactant.

Inventive compositions may contain at least one bleaching agent, also referred to as bleach. Bleaching agents may be selected from chlorine bleach and peroxide bleach, and peroxide bleach may be selected from inorganic peroxide bleach and organic peroxide bleach. Preferred are inorganic peroxide bleaches, selected from alkali metal percarbonate, alkali metal perborate and alkali metal persulfate.

Examples of organic peroxide bleaches are organic percarboxylic acids, especially organic percarboxylic acids.

In inventive compositions, alkali metal percarbonates, especially sodium percarbonates, are preferably used in coated form. Such coatings may be of organic or inorganic nature. Examples are glycerol, sodium sulfate, silicate, sodium carbonate, and combinations of at least two of the foregoing, for example combinations of sodium carbonate and sodium sulfate.

Suitable chlorine-containing bleaches are, for example, 1,3-dichloro-5,5-dimethylhydantoin, N-chlorosulfamide, chloramine T, chloramine B, sodium hypochlorite, calcium hypochlorite, magnesium hypochlorite, potassium hypochlorite, potassium dichloroisocyanurate and sodium dichloroisocyanurate.

Inventive compositions may comprise, for example, in the range from 3 to 10% by weight of chlorine-containing bleach.

Inventive compositions may comprise one or more bleach catalysts. Bleach catalysts can be selected from bleach-boosting transition metal salts or transition metal complexes such as, for example, manganese-, iron-, cobalt-, ruthenium- or molybdenum-salen complexes or carbonyl complexes. Manganese, iron, cobalt, ruthenium, molybdenum, titanium, vanadium and copper complexes with nitrogen-containing tripod ligands and also cobalt-, iron-, copper- and ruthenium-amine complexes can also be used as bleach catalysts.

Inventive compositions may comprise one or more bleach activators, for example N-methylmorpholinium-acetonitrile salts ("MMA salts"), trimethylammonium acetonitrile salts, N-acylimides such as, for example, N-nonanoylsuccinimide, 1,5-diacetyl-2,2-dioxohexahydro-1,3,5-triazine ("DADHT") or nitrile quats (trimethylammonium acetonitrile salts).

Further examples of suitable bleach activators are tetraacetylethylenediamine (TAED) and tetraacetylhexylenediamine.

Examples of fragrances are benzyl salicylate, 2-(4-tert.-butylphenyl) 2-methylpropional, commercially available as Lilial®, and hexyl cinnamaldehyde.

Examples of dyestuffs are Acid Blue 9, Acid Yellow 3, Acid Yellow 23, Acid Yellow 73, Pigment Yellow 101, Acid Green 1, Solvent Green 7, and Acid Green 25.

Inventive compositions may contain one or more preservatives or biocides. Biocides and preservatives prevent alterations of inventive liquid detergent compositions due to attacks from microorganisms. Examples of biocides and preservatives are BTA (1,2,3-benzotriazole), benzalkonium chlorides, 1,2-benzisothiazolin-3-one ("BIT"), 2-methyl-2H-isothiazol-3-one ("MIT") and 5-chloro-2-methyl-2H-isothiazol-3-one ("CIT"), benzoic acid, sorbic acid, 1-5-pentandial, iodopropynyl butylcarbamate ("IPBC"), dichlorodimethylhydantoine ("DCDMH"), bromochlorodimethylhydantoine ("BCDMH"), and dibromodimethylhydantoine ("DBDMH"). Further examples of preservatives are 2-phenoxy ethanol and 4,4'-dichloro 2-hydroxydiphenyl ether ("diclosan").

Examples of viscosity modifiers are agar-agar, carragene, tragacanth, gum arabic, alginates, pectins, hydroxyethyl cellulose, hydroxypropyl cellulose, starch, gelatin, locust bean gum, cross-linked poly(meth)acrylates, for example polyacrylic acid cross-linked with bis-(meth)acrylamide, furthermore silicic acid, clay such as—but not limited to—montmorrilionite, zeolite, dextrin, and casein.

Hydrotropes in the context with the present invention are compounds that facilitate the dissolution of compounds that exhibit limited solubility in water. Examples of hydrotropes are organic solvents such as ethanol, isopropanol, ethylene glycol, 1,2-propylene glycol, and further organic solvents that are water-miscible under normal conditions without limitation. Further examples of suitable hydrotropes are the sodium salts of toluene sulfonic acid, of xylene sulfonic acid, and of cumene sulfonic acid.

Examples of polymers other than polymer (A) are especially polyacrylic acid and its respective alkali metal salts, especially its sodium salt. A suitable polymer is in particular polyacrylic acid, preferably with an average molecular weight $M_w$ in the range from 2,000 to 40,000 g/mol. preferably 2,000 to 10,000 g/mol, in particular 3,000 to 8,000 g/mol, each partially or fully neutralized with alkali, especially with sodium. Suitable as well are copolymeric polycarboxylates, in particular those of acrylic acid with methacrylic acid and of acrylic acid or methacrylic acid with maleic acid and/or fumaric acid. Polyacrylic acid and its respective alkali metal salts may serve as soil anti-redeposition agents.

Further examples of polymers are polyvinylpyrrolidones (PVP). Polyvinylpyrrolidones may serve as dye transfer inhibitors.

Further examples of polymers are polyethylene terephthalates, polyoxyethylene terephthalates, and polyethylene terephthalates that are end-capped with one or two hydrophilic groups per molecule, hydrophilic groups being selected from $CH_2CH_2CH_2—SO_3Na$, $CH_2CH(CH_2—SO_3Na)_2$, and $CH_2CH(CH_2SO_2Na)CH_2—SO_3Na$.

Examples of buffers are monoethanolamine and N,N,N-triethanolamine.

Examples of defoamers are silicones.

Inventive compositions are not only good in cleaning soiled laundry with respect to organic fatty soil such as oil. Inventive liquid detergent compositions are very useful for removing nonbleachable stains such as, but not limited to stains from red wine, tea, coffee, vegetables, and various fruit juices like berry juices from laundry. They still do not leave residues on the clothes.

A further aspect of the present invention is therefore the use of inventive compositions for laundry care. Laundry care in this context includes laundry cleaning.

In another aspect, inventive compositions are useful for hard surface cleaning. A further aspect of the present invention is therefore the use of inventive compositions for hard surface cleaning.

In the context of the present invention, the term "composition for hard surface cleaning" includes cleaners for home care and for industrial or institutional applications. The term "composition for hard surface cleaning" includes compositions for dishwashing, especially hand dishwash and automatic dishwashing and ware-washing, and compositions for hard surface cleaning such as, but not limited to compositions for bathroom cleaning, kitchen cleaning, floor cleaning, descaling of pipes, window cleaning, car cleaning including truck cleaning, furthermore, open plant cleaning, cleaning-in-place, metal cleaning, disinfectant cleaning, farm cleaning, high pressure cleaning, but not laundry detergent compositions. A special embodiment of compositions for hard surface cleaning are automatic dishwashing compositions.

In the context of the present invention, the terms "compositions for hard surface cleaning" and "compositions for hard surface cleaners" are used interchangeably.

In the context of the present invention and unless expressly stated otherwise, percentages in the context of ingredients of laundry detergent compositions are percentages by weight and refer to the total solids content of the respective laundry detergent composition. In the context of the present invention and unless expressly stated otherwise, percentages in the context of ingredients of detergent composition for hard surface cleaners are percentages by weight and refer to the total solids content of the detergent composition for hard surface cleaning.

Inventive compositions when used for automatic dishwashing preferably contain (E) at least one builder component selected from aminopolycarboxylic acids and preferably their alkali metal salts, in the context of the present invention also referred to as complexing agent (E) or sequestrant (E). In the context of the present invention, the terms sequestrants and chelating agents are used interchangeably.

Examples of sequestrants (E) are alkali metal salts of MGDA (methyl glycine diacetic acid), GLDA (glutamic acid diacetic acid), IDS (iminodisuccinate), EDTA, and polymers with complexing groups like, for example, polyethylenimine in which 20 to 90 mole-% of the N-atoms bear at least one $CH_2COO^-$ group, and their respective alkali metal salts, especially their sodium salts, for example MGDA-$Na_3$, GLDA-$Na_4$, or IDS-$Na_4$.

Preferred sequestrants are those according to general formula (IX a)

$$[CH_3—CH(COO)—N(CH_2—COO)_2]M_{3-x}H_x \qquad \text{(IX a)}$$

wherein M is selected from ammonium and alkali metal cations, same or different, for example cations of sodium, potassium, and combinations of at least two of the foregoing. Ammonium may be substituted with alkyl but non-substituted ammonium $NH_4^+$ is preferred. Preferred examples of alkali metal cations are sodium and potassium and combinations of sodium and potassium, and even more preferred in compound according to general formula (II a) all M are the same and they are all Na;

and x in formula (II a) is in the range of from zero to 1.0, or (IX b)

$$[OOC-CH_2CH_2—CH(COO)—N(CH_2—COO)_2]M_{4-x}H_x \qquad \text{(IX b)}$$

wherein M is as defined above, and x in formula (IX b) is in the range of from zero to 2.0, preferably to 1.0, or (IX c)

$$[OOC—CH_2—CH(COO)]—N—CH(COO)—CH_2—COO]M_{4-x}H_x \qquad \text{(IX c)}$$

wherein M is as defined above, and x in formula (II c) is in the range of from zero to 2.0, preferably to 1.0.

In one embodiment of the present invention, said inventive composition contains a combination of at least two of the foregoing, for example a combination of chelating agent according to general formula (IX a) and a chelating agent according to general formula (IX b).

Chelating agents according to the general formulae (IX a) and (IX b) are preferred. Even more preferred are chelating agents according to the general formula (IX a).

In one embodiment of the present invention, compound according to general formula (IX a) is selected from ammonium or alkali metal salt of racemic MGDA and from ammonium and alkali metal salts of mixtures of L- and D-enantiomers according to formula (IX a), said mixture containing predominantly the respective L-isomer with an enantiomeric excess (ee) in the range of from 5 to 99%, preferably 5 to 95%, more preferably from 10 to 75% and even more preferably from 10 to 66%.

In one embodiment of the present invention, compound according to general formula (IX b) is selected from at least one alkali metal salt of a mixture of L- and D-enantiomers according to formula (IX b), said mixture containing the racemic mixture or preferably predominantly the respective L-isomer, for example with an enantiomeric excess (ee) in the range of from 5 to 99%, preferably 15 to 95%.

The enantiomeric excess of compound according to general formula (IX a) may be determined by measuring the polarization (polarimetry) or preferably by chromatography, for example by HPLC with a chiral column, for example with one or more cyclodextrins as immobilized phase or with a ligand exchange (Pirkle-brush) concept chiral stationary phase. Preferred is determination of the ee by HPLC with an immobilized optically active amine such as D-penicillamine in the presence of copper (+II) salt. The enantiomeric excess of compound according to general formula (IX b) salts may be determined by measuring the polarization (polarimetry).

Due to the environmental concerns raised in the context with the use of phosphates, it is preferred that advantageous compositions are free from phosphate. "Free from phosphate" should be understood in the context of the present invention as meaning that the content of phosphate and polyphosphate is in sum in the range of from detection level to 1% by weight, preferably from 10 ppm to 0.2% by weight, determined by gravimetry.

In one embodiment of the present invention, inventive compositions contain in the range of from 0.5 to 50% by weight of sequestrant (E), preferably 1 to 35% by weight, referring to the total solids content.

In order to be suitable as liquid laundry compositions, inventive compositions may be in bulk form or as unit doses, for example in the form of sachets or pouches. Suitable materials for pouches are water-soluble polymers such as polyvinyl alcohol.

In a preferred embodiment of the present invention, inventive compositions are liquid or gel-type at ambient temperature. In another preferred embodiment of the present invention, inventive compositions are solid at ambient temperature, for example powders or tabs.

In one embodiment of the present invention, inventive compositions are liquid or gel-type and have a pH value in the range of from 7 to 9, preferably 7.5 to 8.5. In embodiments where inventive compositions are solid, their pH value may be in the range of from 7.5 to 11, determined after dissolving 1 g/100 ml in distilled water and at ambient temperature. In embodiments where inventive compositions are used for hard surfaces like tiles, for example bathroom tiles, their pH value may even be acidic, for example from 3 to 6.

In one embodiment of the present invention, inventive compositions are liquid or gel-type and have a total solids content in the range of from 8 to 80%, preferably 10 to 50%, determined by drying under vacuum at 80° C.

Another aspect of the present invention is related to polymers (A), hereinafter also referred to as inventive polymers (A) or simply as polymers (A). Inventive polymers (A) comprise (a) a core that bears one to three moieties according to general formula (I)

(I)

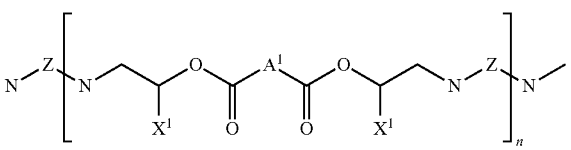

wherein Z are different or the same and selected from $C_5$-$C_{20}$-alkylene, preferably $C_6$-$C_{12}$-alkylene, straight-chain or branched, wherein in said $C_5$-$C_{20}$-alkylene or $C_6$-$C_{12}$-alkylene at least one C-atom is replaced by an N-atom that bears a polyalkylene chain, for example one to 3 C-atoms are replaced.

Beyond the foregoing, said $C_5$-$C_{20}$-alkylene or $C_6$-$C_{12}$-alkylene may otherwise be non-substituted or substituted with one or more O—$C_1$-$C_4$-alkyl groups.

In one embodiment of the present invention, all Z are selected from $(CH_2)_{z1}$—$[N(CH_2)_{z2}]_{z4}$—$N(CH_2)_{z3}$—, wherein the variables z1, z2 and z3 are independently from each other selected from 2 to 4 and wherein z4 is selected from zero to 2, and wherein each $CH_2$-group may be substituted with one to two methyl or methoxy groups or preferably be non-substituted.

Said polyalkylene oxide side chains may be derived from $C_2$-$C_4$-alkylene oxide. Examples of $C_2$-$C_4$-alkylene oxides are ethylene oxide ("EO"), propylene oxide ("PO"), butylene oxide ("BuO"), and combinations of at least two of the foregoing, for example ethylene oxide and propylene oxide or ethylene oxide and butylene oxide, preferably in each case with the majority of the alkylene oxide units being EO. Preferred are propylene oxide and ethylene oxide with the majority being ethylene oxide, more preferred is ethylene oxide.

In one embodiment of the present invention, all Z are selected from —$(CH_2)_3$—N—$(CH_2)_3$— and $(CH_2)_3$—N—$(CH_2)_2$— and —$(CH_2)_3$—$N(CH_2)_2$—N—$(CH_2)_3$—. Preferably, all Z are same.

$X^1$ is selected from hydrogen and methyl and ethyl and combinations of at least two of the foregoing, preferred are methyl and combinations of methyl and hydrogen, and more preferred is hydrogen, $A^1$ are different or the same and selected from $C_1$-$C_{12}$-alkylene, preferably $C_2$-$C_4$-alkylene, for example —$CH_2CH_2$—, —$(CH_2)_3$—, —$(CH_2)_4$—, —$(CH_2)_5$—, —$(CH_2)_6$—, —$(CH_2)_8$-, —$(CH_2)_{10}$—, —$(CH_2)_{12}$—, preferred are —$CH_2CH_2$—, —$(CH_2)_3$—, —$(CH_2)_4$—, furthermore $C_6$-arylene, and $C_3$-$C_{12}$-cycloalkylene wherein $C_1$-$C_{12}$-alkylene and $C_3$-$C_{12}$-cycloalkylene may be non-substituted or substituted with one or more O—$C_1$-$C_4$-alkyl groups or OH groups and wherein $C_3$-$C_{12}$-cycloalkylene may bear one to three methyl groups, or based on citric acid, for example —$CH_2$—$C(CO_2H)(OH)$—$CH_2$— or —$CH_2$—$C(OH)(CH_2$—$COOH)$—.

In one embodiment of the present invention, $A^1$ in inventive polymer (A) is a mixture of $C_2$-$C_4$-alkylene and citric acid-based residues, for example in a molar ratio of from 1:10 to 15:1, preferably 1:5 to 10:1.

n is in the range of from 1 to 100, preferably 10 to 75.

The free valences on the nitrogen atoms in formula (I) bear polyalkylene chains (b) or —$CH_2$—$CH(X^1)$—O(CO)-$A^1$-(CO)—O—$CHX^1$—$CH_2$—N—Z—N units, or hydrogen atoms. In embodiments with molecular weights $M_w$ of 10,000 g/mol or more, the free valences on the nitrogen atoms in formula (I) bear polyalkylene chains (b) or —$CH_2$—$CH(X^1)$—O—$CHX^1$—$CH_2$—N—Z—N units.

In one embodiment of the present invention, inventive polymer (A) may additionally bear one or more structural units according to general formula (X)

(X-1)

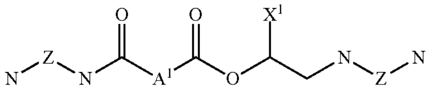

(X-2)

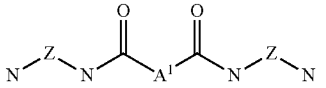

In one embodiment of the present invention, inventive polymer (A) has an average molecular weight $M_w$ in the range of from 2,500 to 300,000 g/mol, preferably 5,000 to 250,000 g/mol. The average molecular weight may be determined, e.g., by GPC in THF as mobile phase, with linear PMMA as standard.

In one embodiment of the present invention, inventive polymer (A) has a molecular weight distribution $M_w/M_n$ in the range of from 1.1 to 2.5.

In one embodiment of the present invention, inventive polymer (A) has a Hazen colour number in the range of from 20 to 500, determined in a 10% weight aqueous solution.

In one embodiment of the present invention, inventive polymer (A) has an OH value, measured according to DIN 53240 (2013), in the range of from 20 to 650, preferably 30 to 100 mg KOH/g polymer (A).

In one embodiment of the present invention, inventive polymer (A) has a total amine value in the range of from 10 to 650, preferably 10 to 510 and more preferably 10 to 80 mg KOH/g polymer (A), determined according to ASTM D2074-07.

Inventive polymer (A) further comprises (b) polyalkylene oxide chains.

Said polyalkylene oxide side chains may be derived from $C_2$-$C_4$-alkylene oxide. Examples of $C_2$-$C_4$-alkylene oxides are ethylene oxide ("EO"), propylene oxide ("PO"), butylene oxide ("BuO"), and mixtures of at least two of the foregoing, for example ethylene oxide and propylene oxide or ethylene oxide and butylene oxide. Preferred are propylene oxide and ethylene oxide, more preferred is ethylene oxide.

In one embodiment of the present invention, the weight ratio of core (a) to polyalkylene oxide chains (b) in inventive polymer (A) is in the range of from 1 to 100 up to 1 to 2, preferred are 1 to 40 up to 1 to 3.

Inventive polymers (A) are excellently suited as or for the manufacture of inventive compositions. Inventive polymers (A) show biodegradability.

In one aspect, the invention is directed to a method of improving the cleaning performance of a liquid detergent composition, by adding a polymer (A) according to the invention to a detergent composition preferably comprising at least one lipase and/or at least one protease.

The term “improved cleaning performance” herein may indicate that the polymer (A) provides better, i.e., improved, properties in stain removal under relevant cleaning conditions, when compared to the cleaning performance of a detergent composition lacking polymer (A). In one embodiment, “improved cleaning performance” means that the cleaning performance of a detergent comprising polymer (A) and at least one enzyme, preferably at least one hydrolase (B), especially at least one lipase (B) and/or at least one protease (D), is improved when compared to the cleaning performance of a detergent comprising polymer (A) and no enzyme. In one embodiment, “improved cleaning performance” means that the cleaning performance of a detergent comprising polymer (A) and an enzyme, preferably hydrolase (B), more preferably lipase (B) and/or protease (D), is improved when compared to the cleaning performance of a detergent comprising at least one enzyme, preferably at least one hydrolase (B), preferably lipase (B) and/or at least one protease (D) and no polymer (A).

The term “relevant cleaning conditions” herein refers to the conditions, particularly cleaning temperature, time, cleaning mechanics, suds concentration, type of detergent and water hardness, actually used in laundry machines, automatic dish washers or in manual cleaning processes.

A further aspect of the present invention relates to a process for making inventive polymers (A), hereinafter also referred to as inventive process. The inventive process comprises steps (α), (β), and (γ):

(α) reacting an amine according to general formula $H_2N—Z'—NH_2$ with alkylene oxide in a molar ratio alkylene oxide:N-atom of from 3:1 to 1:3, preferably 1.5:1.0 to 1.0:2.5, and even more preferably with alkylene oxide being selected from ethylene oxide and propylene oxide, thereby forming an intermediate, (β) reacting the intermediate from step (α) with at least one dicarboxylic or tricarboxlic acid or with a mixture of the foregoing, or, in each case, with their respective anhydrides or $C_1$-$C_4$-alkylesters, thereby obtaining an ester, (γ) reacting the ester from step (β) with at least one $C_2$-$C_4$-alkylene oxide in one or more steps.

Steps (α), (β) and (γ) are described in more detail below.

In step (α), an amine according to general formula $H_2—N—Z'—NH_2$ is reacted with an alkylene oxide. The variable Z' is defined like Z but N atom(s) bear(s) H instead of polyalkylene oxide chains. For the purpose of the present invention, mixtures of isomeric amines are considered “an amine”.

Preferred examples of amines $H_2—N—Z'—NH_2$ are $H_2N—(CH_2)_3—NH—(CH_2)_3—NH_2$, $H_2N—(CH_2)_3—NH(CH_2)_2—NH_2$ (“$N_3$-amine”) and (N,N'-bis-(3-aminopropyl)-ethylene diamine (“N4-amine”), $H_2N—(CH_2)_3—NH—(CH_2)_2—NH—(CH_2)_3—NH_2$, as well as combinations of N3-amine and N4-amine, for example in a molar ratio in the range of from 1:9 to 9:1.

Alkylene oxides reacted in step (α) are selected from ethylene oxide (“EO”), propylene oxide (“PO”), and mixtures of the foregoing. Preferred are propylene oxide and ethylene oxide, more preferred is ethylene oxide.

In an exemplified step (α) based on N4-amine and ethylene oxide, a mixture of compounds is formed that contains the following compound:

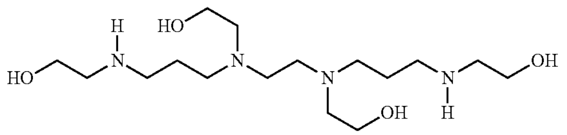 [SMILES: OCCNCCCN(CCO)CCN(CCO)CCCNCCO]

and—depending on the ratio of EO to N, one or more of the following:

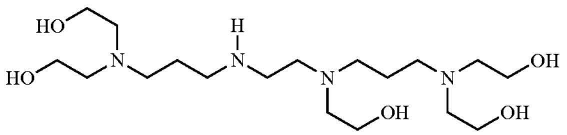

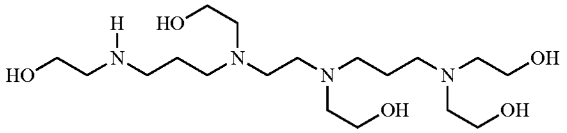

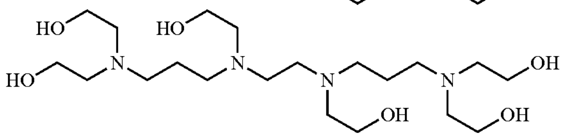

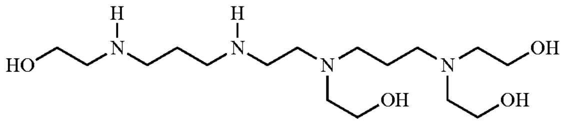

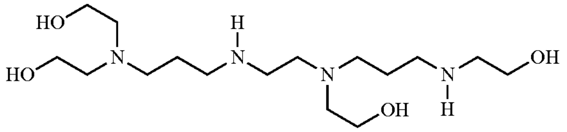

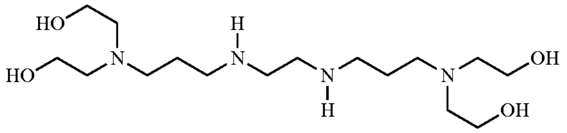

and the respective monoethoxylates.

Step (α) may be performed with or without a solvent. In embodiments wherein amine according to general formula $H_2—N—Z'—NH_2$ is liquid at reaction temperature it is preferred to use said amine in bulk. In embodiments wherein amine according to general formula $H_2—N—Z'—NH_2$ is solid at reaction temperature it is preferred to use a solvent. Suitable solvents are aprotic solvents, for example hydrocarbons such as toluene and ethers, e.g. di-n-butyl ether.

In one embodiment of the present invention, step (α) may include dilution of amine according to general formula $H_2—N—Z'—NH_2$ with water before alkoxylation, for example in a ratio amine:water of 100:1 to 1:1, especially from 20:1 to 5:1 by weight.

Preferably, step (α) is carried out in the absence of a catalyst.

In one embodiment of the present invention, step (α) is performed at a reaction temperature from 90 to 150° C., preferably from 100 to 135° C.

In one embodiment of the present invention, step (α) may be carried out at a pressure of up to 15 bar, preferably up to 10 bar, for example 1 to 8 bar. Preferred vessels for carrying out step (α) are autoclaves and tubular reactors.

In one embodiment of the present invention, step (α) has a duration in the range of from 30 minutes to 10 hours, preferably 1 hour to 7 hours.

Step (α) may be carried out under an inert gas atmosphere, for example nitrogen or a noble gas. In another embodiment, step (α) is carried out under an atmosphere of alkylene oxide. Inert gas atmosphere is preferred. From step (α), an intermediate is formed. It is possible to work up the intermediate, for example by removal of unreacted alkylene oxide and of water, if present, or to use the intermediate from step (α) without further work-up. Said removal of unreacted alkylene oxide and of water, if present, may be performed by evaporation at a pressure in the range of from 500 mbar to 0 mbar, preferred: 100 mbar to 20 mbar and at a temperature in the range of from 20 to 120° C., preferred are 60 to 100° C. The intermediate from step (α) is usually a mixture of compounds.

An intermediate is obtained from step (α).

In step (β), the intermediate from step (α) is reacted with at least one dicarboxylic or tricarboxlic acid or with a mixture of the foregoing, or, in each case, with their respective anhydrides or $C_1$-$C_4$-alkylesters, thereby obtaining an ester. Preferred di- and tricarboxylic acids are $C_2$-$C_{10}$-alkylene dicarboxylic acids and $C_4$-$C_{10}$-alkylene tricarboxylic acids and combinations of one $C_4$-$C_{10}$-alkylene tricarboxylic acid and at least one $C_2$-$C_{10}$-alkylene dicarboxylic acid and of the respective $C_1$-$C_4$-alkylesters. Preferred esters are the respective methyl esters and the ethyl esters. $C_2$-$C_{10}$-alkylene and $C_4$-$C_{10}$-alkylene may be non-substituted or substituted, for example with methyl or hydroxyl.

In one embodiment of step (β), the intermediate from step (α) is reacted with the di-$C_1$-$C_2$-alkyl ester of succinic acid, malonic acid, sebacic acid or adipic acid and, optionally, with the triethyl ester of citric acid.

In another embodiment of step (β), the intermediate from step (α) is reacted with succinic acid, malonic acid, sebacic acid, aspartic acid, or adipic acid and, optionally, with citric acid.

Step (β) may be carried out at temperatures in the range of from 20 to 180° C. In embodiments wherein ester(s), in particular $C_1$-$C_2$-alkyl esters are used, such as adipic acid diethyl ester, diethyl succinate, adipic acid dimethyl ester, dimethyl succinate, triethyl citrate or the like, temperatures in the range of from 25 to 150° C. are preferred. In embodiments wherein anhydride(s) are applied, for example succinic anhydride, 25 to 150° C. are preferred. In embodiments wherein the respective free acid(s) are used, temperatures in the range of from 100 to 180° C. are preferred. Especially in embodiments wherein temperatures of 100° C. or more are applied it is preferred to ramp up the temperature.

Step (β) may be performed at any pressure, for example from 10 mbar to 10 bar. Preferred are ambient pressure and pressures below, for example 10 to 500 mbar.

In the course of step (β), water or an alcohol is formed, for example methanol or ethanol. It is preferred to remove such byproducts, for example by distilling them off. Suitable tools are Dean-Stark apparatuses, distillation bridges, water eliminators, and other apparatuses that may serve for removal of water or alcohols by distillation.

Step (β) may be performed in the absence or presence of a solvent. Suitable solvents are aromatic solvents like toluene, aliphatic hydrocarbons or cycloaliphatic solvents, for example decane, cyclohexane, n-heptane and the like. It is preferred, though, to perform step (β) in the absence of a solvent, especially when the reaction mixture is liquid at the reaction temperature.

In one embodiment of the present invention, step (β) is performed in the presence of a catalyst.

Examples of suitable catalysts are especially acidic catalysts, for example inorganic acids and organic acids.

Acidic inorganic catalysts for the purposes of the present invention include for example sulfuric acid, phosphoric acid, phosphonic acid, hypophosphorous acid $H_3PO_2$, aluminum sulfate hydrate, alum, acidic silica gel (pH value 5 to 6) and acidic alumina. Suitable are as well, for example, aluminum compounds of the general formula $Al(OR_5)_3$ and titanates of the general formula $Ti(OR_5)_4$ as acidic inorganic catalysts, the residues $R^5$ each being identical or different and being chosen independently of one another from

- $C_1$-$C_{10}$-alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl or n-decyl,
- $C_3$-$C_{12}$-cycloalkyl, examples being cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl.

Preferably the residues $R^5$ in $Al(OR^5)_3$ and $Ti(OR^5)_4$ are each identical and chosen from isopropyl or 2-ethylhexyl.

Preferred acidic organometallic catalysts are chosen for example from dialkyltin oxides $(R^5)_2SnO$ with $R^5$ being as defined above. One particularly preferred representative of acidic organometallic catalysts is di-n-butyltin oxide, available commercially in the form of oxo-tin.

Preferred acidic organic catalysts are acidic organic compounds containing, for example, phosphate groups, sulfonic acid groups, sulfate groups or phosphonic acid groups. Particular preference is given to sulfonic acids such as para-toluenesulfonic acid, or methanesulfonic acid for example. Acidic ion exchangers can also be used as acidic organic catalysts, examples being polystyrene resins which contain sulfonic acid groups and have been crosslinked with about 2 mol % of divinylbenzene. Particularly preferred is methanesulfonic acid.

Combinations of two or more of the aforementioned catalysts can also be used. Another possibility is to use those organic or organometallic or else inorganic catalysts which are in the form of discrete molecules, in an immobilized form.

If the use of acidic inorganic, organometallic or organic catalysts is desired, the amount of catalyst used in accordance with the invention is from 0.01 to 10% by weight, preferably from 0.1 to 2% by weight, more preferably 0.2 to 1% by weight, each based on the total amount of the reactants.

In another embodiment of the present invention, step (β) is performed without a catalyst.

In one embodiment of the present invention, step (β) has a duration in the range of from 30 minutes up to 15 hours.

By performing step (β), an ester is obtained.

In one embodiment of the present invention, the reaction in step (β) leads to a complete conversion of all carboxylic acid or ester or anhydride groups of the respective dicarboxylic or tricarboxlic acid or with a mixture of the foregoing, or, in each case, with their respective anhydrides or $C_1$-$C_4$-alkylesters. It is observed, though, that in many embodiments the conversion of ester or carboxylic acid groups or anhydride groups is incomplete, which results in the ester still bearing carboxylic acid groups or $C_1$-$C_4$-alkylester groups. The completeness of the reaction may be assessed by determining the acid number, for example according to EN ISO 660:2009).

In one embodiment of the present invention, further groups of, e.g., citric acid or its $C_1$-$C_4$-esters may react, for example the hydroxyl group.

The ester resulting from step (β) may be isolated and purified, for example by removal of solvent, if applicable, or by neutralization of acid. Especially in embodiments of step (β) in which neither a catalyst nor a solvent was used it is preferred to transfer the resultant ester to step (γ) without further purification steps.

In step (γ), ester from step (β) is reacted with at least one $C_2$-$C_4$-alkylene oxide. Examples of $C_2$-$C_4$-alkylene oxides are ethylene oxide ("EO"), propylene oxide ("PO"), butylene oxide ("BuO"), and mixtures of at least two of the foregoing. Preferred are propylene oxide and ethylene oxide, more preferred is ethylene oxide.

In one embodiment of the present invention, the weight ratio of alkylene oxide in step (γ) and ester from step (β) corresponds to the ratio of core (a) to side chains (b), thus, 1 to 100 up to 1 to 2, preferred are 1 to 40 up to 1 to 3.

Step (γ) is preferably carried out in the presence of a catalyst, for example a base or a double-metal cyanide.

In one embodiment of the present invention, step (γ) is carried out in the presence of a base. Suitable bases such as potassium hydroxide, sodium hydroxide, sodium or potassium alkoxides such as potassium methylate ($KOCH_3$), potassium tert-butoxide, sodium ethoxide and sodium methylate ($NaOCH_3$), preferably from potassium hydroxide and sodium hydroxide. Further examples of catalysts are alkali metal hydrides and alkaline earth metal hydrides such as sodium hydride and calcium hydride, and alkali metal carbonates such as sodium carbonate and potassium carbonate. Preference is given to the alkali metal hydroxides, preference being given to potassium hydroxide and sodium hydroxide, and to alkali metal alkoxides, particular preference being given to potassium t-butoxide in t-butanol, sodium n-hexanolate in n-hexanol, and to sodium methanolate in n-nonanol. Typical use amounts for the base are from 0.05 to 10% by weight, in particular from 0.5 to 2% by weight, based on the total amount of condensate from step (β) and $C_2$-$C_4$-alkylene oxide.

In one embodiment of the present invention, step (γ) is carried out in the presence of a double-metal cyanide. Double-metal cyanides, hereinafter also referred to as double metal cyanide compounds or DMC compounds, usually comprise at least two different metals, at least one of them being selected from transition metals and the other one being selected from transition metals and alkali earth metals, and furthermore cyanide counterions. Particularly suitable catalysts for the alkoxylation are double-metal cyanide compounds which contain zinc, cobalt or iron or two thereof. Berlin blue, for example, is particularly suitable.

Preference is given to using crystalline DMC compounds. In a preferred embodiment, a crystalline DMC compound of the Zn—Co type which comprises zinc acetate as further metal salt component is used as catalyst. Such compounds crystallize in monoclinic structure and have a platelet-like habit.

In one embodiment of the present invention, the inventive synthesis is carried out in the presence of at least one double-metal cyanide selected from hexacyano cobaltates, for example with zinc.

Double-metal cyanide compounds can be used as powder, paste or suspension or be moulded to give a moulding, be introduced into mouldings, foams or the like or be applied to mouldings, foams or the like.

Preferably, the DMC catalyst used for step (γ), based on polycondensate obtained in step (β), is from 5 to 2000 ppm (i.e. mg of catalyst per kg of product), preferably less than 1000 ppm, in particular less than 500 ppm, particularly preferably less than 100 ppm, for example less than 50 ppm or 35 ppm, particularly preferably less than 25 ppm; ppm referring to mass-ppm (parts per million) of polycondensate obtained in step (β).

Step (γ) may be carried out in bulk, embodiment (i), or in an organic solvent, embodiment (ii). In embodiment (i), water can be removed from the polycondensate obtained in step (β). Such water removal can be done by heating to a temperature in the range of from 80 to 150° C. under a reduced pressure in the range of from 0.01 to 0.5 bar and distilling off the water.

In one embodiment of the present invention, step (γ) is carried out at a reaction temperature in the range of from 70 to 200° C. and preferably from 100 to 180° C.

In one embodiment of the present invention, step (γ) is carried out once per synthesis of inventive polymer (A). In an alternative embodiment, step (γ) is carried out several time, for example up to four times per synthesis of an inventive polymer (A), for example with the same or preferably with different $C_2$-$C_4$-alkylene oxides. It is, for example, possible to subject a polycondensate obtained in step (β) to a first alkoxylation (γ1) with ethylene oxide and to subject the product from step (γ1) to a second alkoxylation (γ2), for example with propylene oxide.

In one embodiment of the present invention, step (γ) is carried out at a pressure of up to 10 bar and in particular up to 8 bar, for example 1 to 8 bar.

In one embodiment of the present invention, the reaction time of step (γ) is generally in the range of from 0.5 to 12 hours.

Examples of suitable organic solvents for embodiment (ii) of step (γ) are nonpolar and polar aprotic organic solvents. Examples of particularly suitable nonpolar aprotic solvents include aliphatic and aromatic hydrocarbons such as hexane, cyclohexane, toluene and xylene. Examples of particularly suitable polar aprotic solvents are ethers, in particular cyclic ethers such as tetrahydrofuran and 1,4-dioxane, furthermore N,N-dialkylamides such as dimethylformamide and dimethylacetamide, and N-alkyllactams such as N-methylpyrrolidone. It is as well possible to use mixtures of at least two of the above organic solvents. Preferred organic solvents are xylene and toluene.

In embodiment (ii), the solution obtained in the first step, before or after addition of catalyst and solvent, is dewatered before being subjected to alkylene oxide, said water removal advantageously being done by removing the water at a temperature in the range of from 120 to 180° C., preferably supported by a stream of nitrogen. The subsequent reaction with the alkylene oxide may be effected as in embodiment (i). In embodiment (i), alkoxylated polyalkylenimines according to the invention is obtained directly in bulk and may be dissolved in water, if desired. In embodiment (ii), for work-up organic solvent is typically replaced by water. Alkoxylated polyalkylenimines (B) according to the invention may alternatively be isolated in bulk.

An—optional—step of work-up may include the deactivation of catalyst used in step (γ), in the case of basic catalysts by neutralization.

The inventive process does not require bleaching steps or reductive removal of impurities.

The present invention is further illustrated by working examples.

General Remarks:

Reactions were carried out under nitrogen atmosphere unless expressly noted otherwise.

Percentages refer to % by weight unless expressly stated otherwise.

GPC was carried out with hexafluoroisopropanol ("HFIP") as mobile phase, with linear PMMA as internal standard Hydroxyl values (OH values) were determined according to DIN 53240 (2013).

Amine values were determined according to ASTM D2074-07.

The Hazen colour number was determined according to DIN ISO 6271, ASTM D 1209, with spectrophotometric detection. (2° norm observer, normal light, layer thickness 11 mm, against distilled water).

rpm: revolutions per minute

N,N'-bis-(3-aminopropyl)-ethylenediamine): N4-amine $H_2N—(CH_2)_3—NH—(CH_2)_2—NH_2$ ("N3-amine")

I. Synthesis of Inventive Polymers

I.1 Synthesis of Intermediates, step (α)

I.1.1 Synthesis of ITM.1, Step (α.1)

A 3.5-liter steel autoclave was charged with 1.2 kg (6.88 mol) N4-amine and 120 g water and was then heated to 100° C. Then, 50 g of ethylene oxide were dosed into the autoclave within 10 minutes. The start of an exothermic reaction was observed. Subsequently, 850 g of ethylene oxide ("EO") were dosed into the autoclave within 14 hours, total amount of EO: 20.45 mol. The system was kept at 100° C. for further 6 hours. After that, the mixture is removed from the autoclave and residual EO and water were stripped under reduced pressure (20 mbar) at 80° C. for two hours. 2.1 kg of intermediate ITM.1 were obtained as a yellow wax.

I.1.2 Synthesis of ITM.2, Step (α.2)

A 3.5-liter steel autoclave was charged with 1.0 kg (5.7 mol) N4-amine and 100 g water and was then heated to 100° C. Then, 50 g of ethylene oxide were dosed into the autoclave within 10 minutes. The start of an exothermic reaction was observed. Subsequently, 860 g of ethylene oxide ("EO") were dosed into the autoclave within 20 hours, total amount of EO: 20.7 mol. The system was kept at 100° C. for further 6 hours. After that, the mixture is removed from the autoclave and residual EO and water were stripped under reduced pressure (20 mbar) at 80° C. for two hours. 1.91 kg of intermediate ITM.2 were obtained as a transparent viscous liquid.

I.1.3 Synthesis of ITM.3, Step (α.3)

A 3.5-liter steel autoclave was charged with 1.0 kg (8.53 mol) N3-amine and 100 g water and was then heated to 100° C. Then, 50 g of ethylene oxide were dosed into the autoclave within 10 minutes. The start of an exothermic reaction was observed. Subsequently, 889 g of ethylene oxide ("EO") were dosed into the autoclave within 14 hours, total amount of EO: 21.3 mol. The system was kept at 100° C. for further 6 hours. After that, the mixture is removed from the autoclave and residual EO and water were stripped under reduced pressure (20 mbar) at 80° C. for two hours. 1.94 kg of intermediate ITM.3 were obtained as a viscous liquid.

I.1.4 Synthesis of ITM.4, Step (α.4)

A 3.5-liter steel autoclave was charged with 1.0 kg (5.74 mol) N4-amine and 100 g water and was then heated to 100° C. Then, 50 g of propylene oxide were dosed into the autoclave within 10 minutes. The start of an exothermic reaction was observed. Subsequently, 950 g of propylene oxide ("PO") were dosed into the autoclave within 20 hours, total amount of PO: 17.2 mol. The system was kept at 100° C. for further 6 hours. After that, the mixture is removed from the autoclave and residual PO and water were stripped under reduced pressure (20 mbar) at 80° C. for two hours. 1.91 kg of intermediate ITM.4 were obtained as a transparent viscous liquid.

I.2 Synthesis of Cores (a)

I.2.1 Step (β.1): ITM.1:Citric Acid:Sebacic Acid: 6:1:9

A 500-ml flask equipped with stirrer, Dean-Stark apparatus, nitrogen inlet and inside thermometer was charged with citric acid (14.61 g, 0.076 mol), sebacic acid (138.39 g, 0.684 mol) and ITM.1 (127.0 g, 0.456 mol). The reaction mixture was stirred at 60 rpm under nitrogen atmosphere and heated to 87° C. over a period of 25 minutes. The stirring speed was adjusted to 210 rpm as viscosity decreased with rising temperature. The reaction mixture was then heated to 120 to 130° C. (inside temperature). Mild foaming was observed. Water was distilled off and collected. Stirring at 120-130° C. (inside temperature) was continued under nitrogen atmosphere for a total of 9 hours. Then, the reaction mixture was slowly cooled down. The resultant ester ("core") (a.1) was collected as a clear amber viscous material.

I.2.2 Step (β.2): ITM.1:Citric Acid:Sebacic Acid: 10:1:9

A 500-ml flask equipped with stirrer, Dean-Stark apparatus, nitrogen inlet and inside thermometer was charged with citric acid (11.22 g, 0.058 mol), sebacic acid (106.26 g, 0.525 mol) and ITM.1 (162.5 g, 0.584 mol). The reaction mixture was stirred at 60 rpm under nitrogen atmosphere and heated to 88° C. over a period of 30 minutes. The stirring speed was adjusted to 210 rpm as viscosity decreased with rising temperature. The reaction mixture was then heated to 120-130° C. (inside temperature). Foaming was observed. Water was distilled off and collected. Stirring at 120 to 130° C. (inside temperature) was continued under nitrogen atmosphere for a total of 25 hours. Then, the reaction mixture was slowly cooled down. The resultant ester, core (a.2), was collected as an amber viscous material.

I.2.3 Step (β.3): ITM.1:Citric Acid:Adipic Acid (5:1:4)

A 500-ml flask equipped with stirrer, Dean-Stark apparatus, nitrogen inlet and inside thermometer was charged with citric acid (22.36 g, 0.116 mol), adipic acid (68.08 g, 0.466 mol) and ITM.1 (178.2 g, 0.582 mol). The reaction mixture was stirred at 60 rpm under nitrogen atmosphere and heated to 100° C. over a period of 1 hour. The stirring speed was adjusted to 210 rpm as viscosity decreased with rising temperature. The reaction mixture was then heated to 120-130° C. (inside temperature). Foaming was observed. Water was distilled off and collected. Stirring at 120 to 130° C. (inside temperature) was continued under nitrogen atmosphere for a total of 2 hours. Then, the reaction mixture was slowly cooled down. The resultant ester, core (a.3), was collected as an amber, viscous material.

Further cores were synthesized in accordance with Table 1.

TABLE 1 summary of experimental data core synthesis

| example | core | Based on | acids | molar ratio ITM:acids | Acid number [mg KOH/g] |
|---|---|---|---|---|---|
| (β.1) | (a.1) | ITM.1 | acid1, acid2 | 6:1:9 | 124 |
| (β.2) | (a.2) | ITM.1 | acid1, acid2 | 10:1:9 | 53.6 |
| (β.3) | (a.3) | ITM.1 | acid1, acid3 | 5:1:4 | 116 |
| (β.4) | (a.4) | ITM.1 | acid1, acid2 | 4:1:9 | 168 |
| (β.5) | (a.5) | ITM.3 | acid1, acid3 | 10:1:9 | 94.5 |
| (β.6) | (a.6) | ITM.2 | acid1, acid2 | 9:1:9 | 64.0 |
| (β.7) | (a.7) | ITM.1 | acid1, acid2, acid4 | 9:1:4.5:4 | 67.7 |
| (β.8) | (a.8) | ITM.4 | acid1, acid2 | 6:1:9 | 75.9 |

TABLE 1-continued summary of experimental data core synthesis

| example | core | Based on | acids | molar ratio ITM:acids | Acid number [mg KOH/g] |
|---|---|---|---|---|---|
| (β.9) | (a.9) | ITM.1 | acid1, acid2 | 8:1:9 | 108.7 |
| (β.10) | (a.10) | ITM.1 | acid1, acid2 | 12:1:9 | 138.4 |
| (β.11) | (a.11) | ITM.1 | acid1, acid5 | 6:1:9 | 142 |
| (β.12) | (a.12) | ITM.1 | acid1, acid3 | 6:1:9 | 162 |

acid1: citric acid
acid2: sebacic acid
acid3: adipic acid
acid4: polyethylenoxide diacid, PEG: $M_n$ 200 g/mol
acid5: aspartic acid
n.d .: not determined
The mols of ITM refer to $M_n$ Step (γ.1), Ethoxylation of a Core:

A 3.5-I autoclave was charged with 107.0 g core (a. 1) and 4.5 g of an aqueous potassium hydroxide solution (50% wt) and the water was removed by heating the autoclave to 120° C. under reduced pressure and flushing with nitrogen. The autoclave was heated to 130° C. and 50 g ethylene oxide were dosed within 10 minutes. Then, ethylene oxide according to Table 2 was added to the reaction mixture within 17 hours. The resultant reaction mixture was allowed to react for additional 6 hours at 130° C. Then the autoclave was cooled to 80° C. The reaction mixture was stripped with nitrogen and volatile compounds were removed in vacuo at 80° C. As a result, inventive polymer (A.1.1) was obtained as dark amber solid.

Step (γ.2), Propoxylation of an Inventive Polymer:

A 3.5-I autoclave was charged with 444 g polymer (A.1.1) and 3.5 g of an aqueous potassium hydroxide solution (50% wt) and the water was removed by heating the autoclave to 120° C. under reduced pressure and flushing with nitrogen. The autoclave was heated to 130° C. and 50 g propylene oxide were dosed within 10 minutes. Then, propylene oxide according to Table 2 was added to the reaction mixture within 20 hours. The resultant reaction mixture was allowed to react for additional 6 hours at 130° C. Then the autoclave was cooled to 80° C. The reaction mixture was stripped with nitrogen and volatile compounds were removed in vacuo at 80° C. As a result, polymer (A. 1.2) was obtained as dark amber solid.

TABLE 2 summary of experimental data: synthesis of inventive polymers

| example | polymer | starting material | EO/ OH | PO/ OH | OH value | amine value | $M_n$ | $M_w$ |
|---|---|---|---|---|---|---|---|---|
| (γ.1) | (A.1.1) | (a.1) | 20 | — | 53.5 | 16.3 | 2630 | 6300 |
| (γ.2) | (A.1.2) | (A.1.1) | 20 | 16 | 40.0 | 11.0 | 3310 | 7290 |
| (γ.3) | (A.3.1) | (a.3) | 20 | — | 50.1 | 15 | 3200 | 7600 |
| (γ.4) | (A.3.2) | (A.3.1) | 20 | 16 | 36 | 12 | 4200 | 8800 |
| (γ.5) | (A.5.1) | (a.5) | 20 | — | 51.3 | 16 | 3500 | 6800 |
| (γ.6) | (A.5.2) | (A.5.1) | 20 | 16 | 39.2 | 11 | 4200 | 8002 |
| (γ.7) | (A.61) | (a.6) | 20 | — | 53.1 | 17 | 2800 | 6910 |
| (γ.8) | (A.6.2) | (A.6.1) | 20 | 16 | 41.2 | 12 | 3550 | 7999 |
| (γ.9) | (A.7.1) | (a.7) | 20 | — | 55.1 | 18 | 2794 | 6700 |
| (γ.10) | (A.7.2) | (A.7.1) | 20 | 16 | 38.5 | 12 | 4100 | 7201 |
| (γ.11) | (A.8.1) | (a.8) | 20 | — | 59.2 | 17 | 3730 | 6932 |
| (γ.12) | (A.8.2) | (A.8.1) | 20 | 16 | 42.0 | 12 | 5202 | 8250 |
| (γ.13) | (A.9.1) | (a.9) | 20 | — | 51.5 | 16 | 2965 | 6503 |
| (γ.14) | (A.9.2) | (A.9.1) | 20 | 16 | 40.5 | 11 | 5001 | 7987 |
| (γ.15) | (A.10.1) | (a.10) | 20 | — | 58.8 | 17 | 3065 | 7014 |
| (γ.16) | (A.10.2) | (A.10.1) | 20 | 16 | 45.3 | 12 | 4765 | 8201 |
| (γ.17) | (A.11.1) | (a.11) | 20 | — | 54.3 | 14 | 2950 | 5997 |
| (γ.18) | (A.11.2) | (A.11.1) | 20 | 16 | 44.1 | 10 | 3600 | 6834 |

TABLE 2-continued summary of experimental data: synthesis of inventive polymers

| example | polymer | starting material | EO/ OH | PO/ OH | OH value | amine value | $M_n$ | $M_w$ |
|---|---|---|---|---|---|---|---|---|
| (γ.19) | (A.12.1) | (a.12) | 20 | — | 53.7 | 17 | 3003 | 6240 |
| (γ.20) | (A.12.2) | (A.12.1) | 20 | 16 | 37 | 11 | 4500 | 8054 |
| (γ.34) | (A.2.1) | (a.2) | 30 | — | 132 | 35 | 7208 | 15218 |
| (γ.35) | (A.2.2) | (A2.1) | 30 | 9 | 105 | 27 | 9809 | 16563 |
| (γ.36) | (A.2.3) | (A2.1) | 30 | 16 | 92 | 23 | 7580 | 18631 |
| (γ.37) | (A.2.4) | (A2.1) | 30 | 24 | 80 | 22 | 8030 | 20540 |
| (γ.38) | (A.2.5) | (A2.1) | 30 | 30 | 68 | 18 | 8190 | 22407 |
| (γ.21) | (A.1.3) | (A.1.1) | 20 | 12 | 46 | 15 | 2955 | 6700 |
| (γ.22) | (A.13.1) | (a.3) | 16 | — | 55 | 18 | 2900 | 7200 |
| (γ.23) | (A.13.2) | (A.13.1) | 16 | 12 | 48 | 15 | 3100 | 7050 |
| (γ.24) | (A.15.1) | (a.5) | 24 | — | 46 | 14 | 3647 | 6985 |
| (γ.25) | (A.15.2) | (A.15.1) | 24 | 8 | 43 | 11 | 4076 | 7053 |
| (γ.26) | (A.17.1) | (a.7) | 14 | — | 60 | 21 | 2419 | 6012 |
| (γ.27) | (A.17.2) | (A.17.1) | 14 | 12 | 56 | 19 | 3205 | 6740 |
| (γ.28) | (A.18.1) | (a.8) | 16 | — | 64 | 20 | 3178 | 5961 |
| (γ.29) | (A.18.2) | (A.18.1) | 16 | 6 | 57 | 15 | 3950 | 7105 |
| (γ.30) | (A.19.1) | (a.9) | 24 | — | 48 | 14 | 3200 | 6958 |
| (γ.31) | (A.20.1) | (a.10) | 24 | — | 54 | 15 | 3600 | 7848 |
| (γ.32) | (A.21.1) | (a.11) | 18 | — | 57 | 16 | 2733 | 5539 |
| (γ.33) | (A.21.2) | (A.21.1) | 18 | 8 | 52 | 13 | 3243 | 6267 |

OH value and amine value each n mg KOH/g. $M_n$ and $M_w$ in g/mol

II. Washing and cleaning performance

II.1 Laundry cleaning

The primary wash performance of Inventive polymers was tested in the washing machine preparing wash solutions using water of 14° dH hardness (2.5 mmol/L; Ca:Mg:$HCO_3$ 4:1:8) containing 3.0 g/L of the liquid test detergent L. 1, see composition in Table 3, and 2.0% of an inventive polymer (A.1.1) to (A. 1.2) according to Table 2.

TABLE 3a

L.1 Ingredients of base mixture for a liquid detergent formulation

| ingredient | % by weight |
|---|---|
| Alkylbenzene sulfonic acid ($C_{10}$-$C_{13}$), Na salt | 5.5 |
| $C_{13}$/$C_{15}$-Oxoalkohol reacted with 7 moles of EO | 5.4 |
| 1,2 propylene glycol | 6 |
| ethanol | 2 |
| potassium coconut soap | 2.4 |
| NaOH | 2.2 |
| lauryl ether sulphate (C.1) | 5.4 |
| Sodium citrate | 3 |
| Water | to 100 |

TABLE 3b

L.2 Ingredients of base mixture for a liquid detergent

| ingredient | % by weight |
|---|---|
| Alkylbenzene sulfonic acid ($C_{10}$-$C_{13}$), Na salt | 6.6 |
| $C_{13}$/$C_{15}$-Oxoalkohol reacted with 7 moles of EO | 6.5 |
| 1,2 propylene glycol | 6 |
| ethanol | 2 |
| potassium coconut soap | 2.4 |
| Triethanolamine TEA | 3.0 |
| lauryl ether sulphate (C.1) | 4.6 |
| Trilon M | 2.2 |
| Water | to 100 |

For the performance test in the washing machine (Miele SOFTTRONIC W 1935 WTL, 30° C., short program, 1200 rpm, 3.5 kg ballast load), three multi-stain monitors (M1, M2, M3) were washed together with four SBL-2004 sheets (wfk Testgewebe GmbH, DE; corresponding to 64 grams of ballast soil) as additional soil ballast.

Table 4. Multi-Stain Monitors for the Washing Machine Tests

MSM1 (circular stains, 5 cm diameter):

CFT PC—H144: Red pottery clay on polyester/cotton (65:35)

CFT KC—H115: Standard clay on knitted cotton

CFT PC—H145: Tennis court clay on polyester/cotton (65:35)

CFT KC—H018: Clay, ground soil on knitted cotton

MSM2:

CFT C—S-10: butterfat with colorant on cotton

CFT C—S-62: lard, colored on cotton

CFT C—S-78: soybean oil with pigment on cotton

EMPA 112: cocoa on cotton

EMPA 141/1: lipstick on cotton

EMPA 125: soiling on cotton fabric, sensitive to surfactants as well as to lipases wfk20D: pigment and sebum-type fat on polyester/cotton mixed fabric CFT C—S-70: chocolate/mousse cream on cotton

MSM3:

wfk20D: pigment and sebum-type fat on polyester/cotton mixed fabric

EMPA 101: cotton soiled with carbon black/olive oil

EMPA 141/2: polyester/cotton (65:35) soiled with lipstick

CFT PC—S-04: Olive oil, colored

EMPA 114: cotton soiled with red wine

EMPA 112: cotton soiled with cocoa

EMPA 116: cotton soiled with blood/milk/ink

CFT C—S-01: blood aged on cotton

CFT C—S-08: grass on cotton

CFT C-10: pigment/oil/milk on cotton

CFT PC-05: Blood/milk/ink on polyester/cotton (65:35)

The total level of cleaning was evaluated using color measurements. Reflectance values of the stains on the monitors were measured using a sphere reflectance spectrometer (SF 500 type from Datacolor, USA, wavelength range 360-700 nm, optical geometry) d/8° with a UV cutoff filter at 460 nm. In this case, with the aid of the CIE-Lab color space classification, the brightness L*, the value a* on the red-green color axis and the b* value on the yellow-blue color axis, were measured before and after washing and averaged for the respective stains of the monitor.

The change of the color value (Delta E, ΔE) value, defined and calculated automatically by the evaluation color tools on the following formula, $$\Delta E^*_{ab} = \sqrt{\Delta L^{*2} + \Delta a^{*2} + \Delta b^{*2}}$$

is a measure of the achieved cleaning effect. All experiments were repeated three times to provide a representative average number.

Higher Delta E values show better cleaning. For each stain, a difference of 1 unit can be detected visually by a skilled person. A non-expert can visually detect 2 units easily. The ΔE values of the formulations for the 4, 8 and 11 stains of correspondingly M1 and M2 plus M3 and for some selected single stains are shown in Table 5.

TABLE 5

Results of washing machine test fabric monitors

| Formulation L.1 (3 g/L) or L.2 (2.5 g/L) | ΔE MSM1 (4 stains) with L.1 | ΔE MSM2 + MSM3 (8 + 11 stains) with L.2 | ΔE (PC-H145) MSM1 with L.1 | ΔE (wfk20D) MSM2 with L.2 | ΔE (EMPA 141/2) MSM3 with L.2 |
|---|---|---|---|---|---|
| — | 92.0 | 293.0 | 21.4 | 14.4 | 13.5 |
| (A.1.1) | 103.0 | — | 24.9 | — | — |
| (A.1.2) | — | 317.7 | — | 16.6 | 15.1 |
| (A.1.1) | 103.4 | — | 24.6 | — | — |
| (A.1.3) | — | 311.4 | — | 14.9 | 14.6 |
| (A.13.1) | 101.8 | — | 23.4 | — | — |
| (A.13.2) | — | 313.7 | — | 17.0 | 16.2 |
| (A.5.1) | 102.7 | — | 23.7 | — | — |
| (A.5.2) | — | 316.1 | — | 16.5 | 15.4 |
| (A.15.1) | 98.9 | — | 22.8 | — | — |
| (A.15.2) | — | 320.2 | — | 18.6 | 16.1 |
| (A.6.1) | 100.1 | — | 23.6 | — | — |
| (A.6.2) | — | 314.2 | — | 15.5 | 14.5 |
| (A.17.1) | 101.6 | — | 23.7 | — | — |
| (A.17.2) | — | 310.4 | — | 14.8 | 15.2 |
| (A.18.1) | 100.9 | — | 24.0 | — | — |
| (A.18.2) | — | 319.7 | — | 17.0 | 16.3 |
| (A.19.1) | 102.3 | — | 24.1 | — | — |
| (A.21.2) | — | 316.6 | — | 16.8 | 15.2 |
| (A.20.1) | 97.9 | — | 22.9 | — | — |
| (A.12.1) | 100.0 | — | 23.6 | — | — |

In the tests, a washing performance benefit can be seen for both ΔE of MSM1 and MSM2 plus MSM3 monitors with the inventive polymers. A higher benefit on fat-containing stains like sebum and lipstick (wik20D and EMPA141/2) can be seen with the polymer (A) that is first ethoxylated and then propoxylated.

II.2 Hard Surface Cleaning

Non-ionic surfactant: (IV.1): n-$C_{16}$-alkyl/n-$C_{18}$-alkyl-polyglucoside with y about 1.3

II.2.1 Manufacture of Comparative Formulation C-HSC.1

A 250 ml vessel was charged with 80 g water. Then, 6 g aqueous solution of NaOH (50%) and 8 g butylenediglycol (BDG) were added, followed by 2 g of a 50% aqueous solution of (IV.1). Homogenisation was achieved with moderate stirring (magnetic) at ambient temperature over a period of time of 5 minutes. Comparative formulation C-HSC.1 was obtained.

II.2.2 Manufacture of Inventive Formulation HSC.2

A 250 ml vessel was charged with 80 g water. Then, 6 g aqueous solution of NaOH (50%) and 8 g butylenediglycol (BDG) were added, followed by 2 g of a 50% aqueous solution of (IV.1) and 4 g of inventive polymer (A.3.2). Homogenisation was achieved with moderate stirring (magnetic) at ambient temperature over a period of time of 5 minutes. Inventive formulation HSC.2 was obtained.

II.2.3 Manufacture of Inventive Formulation HSC.3

A 250 ml vessel was charged with 80 g water. Then, 6 g aqueous solution of NaOH (50%) and 8 g butylenediglycol (BDG) were added, followed by 5 g of a 41% by weight solution of MGDA-$Na_3$, 2 g of a 50% aqueous solution of (IV.1) and 2 g of inventive polymer (A.3.2). Homogenisation was achieved with moderate stirring (magnetic) at ambient temperature over a period of time of 5 minutes. Inventive formulation HSC.3 was obtained.

II.2.4 Manufacture of Inventive Formulation HSC.4

A 250 ml vessel was charged with 80 g water. Then, 6 g aqueous solution of NaOH (50%) and 8 g butylenediglycol (BDG) were added, followed by 5 g of a 41% by weight solution of MGDA-$Na_3$, 2 g of a 50% aqueous solution of (IV.1) and 2 g of inventive polymer (A.5.2). Homogenisation was achieved with moderate stirring (magnetic) at ambient temperature over a period of time of 5 minutes. Inventive formulation HSC.4 was obtained.

II.2.5 Manufacture of Inventive Formulation HSC.5

A 250 ml vessel was charged with 80 g water. Then, 6 g aqueous solution of NaOH (50%) and 8 g butylenediglycol (BDG) were added, followed by 5 g of a 41% by weight solution of MGDA-$Na_3$, 2 g of a 50% aqueous solution of (IV.1) and 2 g of inventive polymer (A.9.2). Homogenisation was achieved with moderate stirring (magnetic) at ambient temperature over a period of time of 5 minutes. Inventive formulation HSC.5 was obtained Performance was evaluated with respect to the cleaning performance at ambient temperature on stainless-steel surfaces.

Test soil: a greasy soil was prepared by mixing 25.0% butter, 25.0% lard, 25.0% margarine, 20.0% ketchup, 2.5% mustard and 2.5% potato starch at 40 to 45° C. under continuous stirring. A greasy soil was obtained.

Stainless steel plates (15×10 cm) were pre-cleaned with ethanol, and then their weight was determined. About 1.5 g of greasy soil was applied evenly to each plate with a roller. Then, the plates were heated in an oven to 200° C. for two hours. Then, the plates were allowed to cool down to ambient temperature and stored for two hours. Finally, the cleaning tests were performed.

2 g of inventive formulations/or comparative formulation, respectively, were evenly sprayed onto the soiled stainless-steel plates through a trigger sprayer and allow to act for 2 minutes. In addition, the soiled surface of the plate was wiped with a cellulose-type wet sponge (without applying any force).

The evaluation of the dirt removal was performed visually and refers to an average value of three experiments:

1 No removal

2 Weak removal (10 to 30% surface cleaned)

3 Average removal (40 to up to 70% surface cleaned)

4 Good removal (more than 70 to 90% surface cleaned)

5 Excellent removal (>90% surface cleaned)

Percentages refer to the surface. The results are summarized in Table 6.

TABLE 6

Results of cleaning experiments

| | Cleaning performance stainless steel surface |
|---|---|
| C-HSC.1 | 2.5 |
| HSC.2 | 4.5 |
| HSC.3 | 5.0 |
| HSC.4 | 4.5 to 5.0 |
| HSC.5 | 4.0 |

III. Biodegradation Tests

General: the tests were carried out in accordance with the OECD Guidelines. According to the OECD guidelines a test is valid if:

1. The reference reaches 60% within 14 days.
2. The difference of the extremes of the test replicates by the end of the test is less than 20%.
3. Oxygen uptake of inoculum blank is 20-30 mg Oz/l and must not be greater than 60 mg $O_2$/l.
4. The pH value measured at the end of the test must be between 6 and 8.5.

Description of the test method used in the context of the present invention:

Biodegradation in sewage was tested in triplicate using the OECD 301F manometric respirometry method. OECD 301F is an aerobic test that measures biodegradation of a sewage sample by measuring the consumption of oxygen. To a measured volume of sewage, 100 mg/L test substance, which is the nominal sole source of carbon, was added along with the inoculum (aerated sludge taken from the municipal sewage treatment plant, Mannheim, Germany). This sludge was stirred in a closed flask at a constant temperature (25° C.) for 28 days. The consumption of oxygen is determined by measuring the change in pressure in the closed flask using an Oxi TopC. Carbon dioxide evolved was absorbed in a solution of sodium hydroxide. Nitrification inhibitors were added to the flask to prevent consumption of oxygen due to nitrification. The amount of oxygen taken up by the microbial population during biodegradation of the test substance (corrected for uptake by a blank inoculum run in parallel) is expressed as a percentage of ThOD (theoretical oxygen demand, which is measured by the elemental analysis of the compound). A positive control glucose/glutamic acid is run along with the test samples for each cabinet as reference.

Calculations:

Theoretical oxygen demand: Amount of $O_2$ required to oxidize a compound to its final oxidation products. This is calculated using the elemental analysis data. % Biodegradation Experimental $O_2$ uptake×100 and divided by the theoretical oxygen demand The results of biodegradability tests are summarized in Table 7.

TABLE 7 summary of biodegradation tests

| sample | Biodegradation [%] |
|---|---|
| (A.1.1) | 62 |
| (A.1.2) | 66 |
| (A.3.1) | 58 |
| (A.3.2) | 61 |
| (A.5.1) | 63 |
| (A.5.2) | 67 |
| (A.6.1) | 59 |
| (A.6.2) | 63 |
| (A.7.1) | 65 |
| (A.7.2) | 69 |
| (A.8.1) | 59 |
| (A.8.2) | 69 |
| (A.9.1) | 57 |
| (A.9.2) | 65 |
| (A.10.1) | 59 |
| (A.10.2) | 67 |
| (A.11.1) | 56 |
| (A.11.2) | 59 |
| (A.12.1) | 62 |
| (A.12.2) | 65 |
| (A.1.3) | 58 |
| (A.13.1) | 62 |
| (A.13.2) | 59 |
| (A.15.1) | 65 |
| (A.15.2) | 69 |
| (A.17.1) | 54 |
| (A.17.2) | 59 |
| (A.18.1) | 63 |
| (A.18.2) | 65 |
| (A.19.1) | 69 |
| (A.20.1) | 70 |
| (A.21.1) | 61 |

TABLE 7-continued

| summary of biodegradation tests | |
|---|---|
| sample | Biodegradation [%] |
| (A.2.1) | 59 |
| (A.2.2) | 62 |
| (A.2.3) | 64 |
| (A.2.4) | 63 |
| (A.2.5) | 65 |

In each test, the reference had a biodegradability of more than 60%.

The invention claimed is:

1. A liquid detergent composition comprising (A) at least one polymer comprising (a) a core that bears 1 to 3 moieties of the general formula (I), (I)

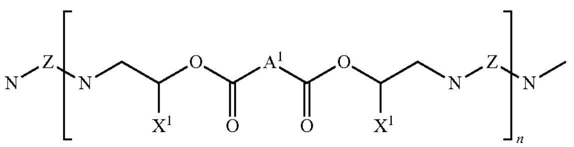

wherein Z are different or the same and selected from the group consisting of $C_5$-$C_{20}$-alkylene wherein in said $C_5$-$C_{20}$-alkylene at least one C-atom is replaced by an N-atom that bears a polyalkylene chain and wherein the C-atoms in said $C_5$-$C_{20}$-alkylene may be non-substituted or substituted with one or more O—$C_1$-$C_4$-alkyl groups, $A^1$ are different or the same and selected from the group consisting of $C_1$-$C_{12}$-alkylene, $C_6$-arylene, and $C_3$-$C_{12}$-cycloalkylene, wherein $C_1$-$C_{12}$-alkylene and $C_3$-$C_{12}$-cycloalkylene may be non-substituted or substituted with one or more O—$C_1$-$C_4$-alkyl groups or OH groups, and wherein $C_3$-$C_{12}$-cycloalkylene may bear one to three methyl groups, or based on citric acid, $X^1$ is selected from the group consisting of hydrogen, methyl, ethyl and combinations of at least two thereof, n is in a range of from 1 to 100, and (b) polyalkylene oxide chains.

2. The composition according to claim 1, wherein all Z are selected from the group consisting of $(CH_2)_{z1}$-$[N(CH_2)_{z2}]_{z4}$-$N(CH_2)_{z3}$-, wherein the variables z1, z2 and z3 are independently from each other selected from 2 to 4, and wherein z4 is selected from zero to 2, and wherein each $CH_2$-group may be non-substituted or substituted with one to two methyl or methoxy groups.

3. The composition according to claim 1, wherein said composition additionally comprises (B) at least one hydrolase.

4. The composition according to claim 3, wherein said hydrolyse (B) is a lipase (B) that is selected from the group consisting of triacylglycerol lipases (EC 3.1.1.3).

5. The composition according to claim 1, wherein said polymer (A) has an average molecular weight $M_w$ in a range of from 2,500 to 80,000 g/mol.

6. The composition according to claim 1, wherein all Z are selected from the group consisting of —$(CH_2)_3$—N—$(CH_2)_2$, —$(CH_2)_3$—N—$(CH_2)_3$— and —$(CH_2)_3$—$N(CH_2)_2$—N—$(CH_2)_3$-.

7. A method of using a composition according to claim 1, the method comprising using the composition for laundry care or hard surface cleaning by contacting the composition with laundry or a hard surface.

8. A polymer comprising (a) a core that bears one to 3 moieties of the general formula (I)

(I)

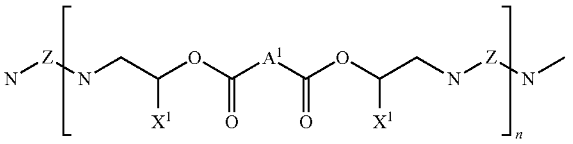

wherein Z are different or the same and selected from the group consisting of $C_5$-$C_{20}$-alkylene wherein in said $C_5$-$C_{20}$-alkylene at least one C-atom is replaced by an N-atom that bears a polyalkylene chain and wherein the C-atoms in said $C_5$-$C_{20}$-alkylene may be non-substituted or substituted with one or more O—$C_1$-$C_4$-alkyl groups, $A^1$ are different or the same and selected from the group consisting of $C_1$-$C_{12}$-alkylene, $C_6$-arylene, and —$CH_2C(CO_2X^2)(OH)$—$CH_2$- and $C_3$-$C_{12}$-cycloalkylene, wherein $C_1$-$C_{12}$-alkylene and $C_3$-$C_{12}$-cycloalkylene may be non-substituted or substituted with one or more O—$C_1$-$C_4$-alkyl groups or OH groups, and wherein $C_3$-$C_{12}$-cycloalkylene may bear one to three methyl groups, or based on citric acid, $X^1$ is selected from the group consisting of hydrogen, methyl, ethyl and combinations of at least two thereof, n is in a range of from 1 to 100, $X^2$ is selected from the group consisting of $C_1$-$C_4$-alkyl, hydrogen, and $CH(X^1)$—$CH_2$—N—Z— and (b) polyalkylene oxide chains.

9. A polymer according to claim 8 having an average molecular weight $M_w$ in a range of from 2,500 to 80,000 g/mol.

10. The polymer according to claim 8, wherein all Z are selected from the group consisting of $(CH_2)_{z1}$-$[N(CH_2)_{z2}]_{z4}$-$N(CH_2)_{z3}$-, wherein the variables z1, z2 and z3 are independently from each other selected in a range of from 2 to 4, and wherein z4 is selected in a range of from zero to 2, and wherein each $CH_2$-group may be, each non-substituted or substituted with one to 2 methyl or methoxy groups.

11. The polymer according to claim 8, wherein all Z are selected from the group consisting of —$(CH_2)_3$—N—$(CH_2)_2$, —$(CH_2)_3$—N—$(CH_2)_3$— and —$(CH_2)_3$—$N(CH_2)_2$—N—$(CH_2)_3$—.

12. The polymer according to claim 8, wherein $A^1$ is selected from the group consisting of $C_1$-$C_4$-alkylene.

13. A process for making polymers according to claim 8, comprising the steps of (α) reacting an amine according to general formula $H_2N$—Z'—$NH_2$ with alkylene oxide in a molar ratio alkylene oxide:N-atom of from 3:1 to 1:3, wherein alkylene oxide is selected from the group consisting of ethylene oxide and propylene oxide, thereby forming an intermediate, and wherein Z' is defined like Z but N atoms bear H instead of polyalkylene oxide chains, (β) reacting the intermediate from step (α) with at least one dicarboxylic or tricarboxlic acid or with a mixture thereof, or, in each case, with their respective anhydrides or $C_1$-$C_4$-alkylesters, thereby obtaining an ester, and (γ) reacting the ester from step (β) with at least one $C_2$-$C_4$-alkylene oxide in one or more steps.

14. A process according to claim 13, wherein, in step (β), the intermediate from step (α) is reacted with the di-$C_1$-$C_2$-alkyl ester of succinic acid, malonic acid, sebacic acid or adipic acid and, optionally, with the triethyl ester of citric acid.

15. A method of improving the cleaning performance of a liquid detergent composition by adding a polymer (A) according to claim 8 to a detergent composition that comprises at least one lipase and/or at least one protease.

* * * * *